United States Patent
Hodge et al.

(10) Patent No.: US 10,762,353 B2
(45) Date of Patent: Sep. 1, 2020

(54) INMATE TRACKING SYSTEM IN A CONTROLLED ENVIRONMENT

(71) Applicant: **GLOBAL TEL*LINK CORPORATION**, Reston, VA (US)

(72) Inventors: Stephen L. Hodge, Aubrey, TX (US); Anthony Bambocci, Altoona, PA (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 15/488,180

(22) Filed: Apr. 14, 2017

(65) Prior Publication Data

US 2018/0300555 A1 Oct. 18, 2018

(51) Int. Cl.
G06K 9/00 (2006.01)
G08B 13/196 (2006.01)
H04L 29/08 (2006.01)

(52) U.S. Cl.
CPC ..... G06K 9/00771 (2013.01); G06K 9/00335 (2013.01); G08B 13/1966 (2013.01); G08B 13/19613 (2013.01); G08B 13/19663 (2013.01); G08B 13/19684 (2013.01); H04L 67/12 (2013.01); H04L 67/306 (2013.01)

(58) Field of Classification Search
None
See application file for complete search history.

(56) References Cited

U.S. PATENT DOCUMENTS

| | | |
|---|---|---|
| 6,130,705 A | 10/2000 | Lareau |
| 7,106,843 B1 | 9/2006 | Gainsboro et al. |
| 7,555,383 B2 | 6/2009 | Siegel |
| 8,229,163 B2 | 7/2012 | Coleman et al. |
| 8,706,914 B2 | 4/2014 | Duchesneau |
| 8,948,935 B1 | 2/2015 | Peeters et al. |
| 9,300,925 B1 * | 3/2016 | Zhang ............ H04N 7/181 |
| 9,387,928 B1 | 7/2016 | Gently et al. |
| 9,442,485 B1 | 9/2016 | McDermott et al. |
| 9,471,059 B1 | 10/2016 | Wilkins |
| 9,607,219 B2 | 3/2017 | Greveson et al. |
| 9,645,582 B2 | 5/2017 | Shue |
| 9,874,308 B2 | 1/2018 | Saika et al. |
| 2004/0030449 A1 | 2/2004 | Solomon |
| 2007/0112461 A1 | 5/2007 | Zini et al. |
| 2008/0043993 A1 * | 2/2008 | Johnson ............ H04M 11/04 379/386 |

(Continued)

OTHER PUBLICATIONS

Zuercher, "Zuercher Jail", 2016 (Year: 2016).*

(Continued)

*Primary Examiner* — Jiangeng Sun
(74) *Attorney, Agent, or Firm* — Sterne, Kessler, Goldstein & Fox P.L.L.C.

(57) ABSTRACT

A monitoring system and a method for operating the monitoring system in an inmate tracking system in a controlled environment is disclosed. The monitoring system receives video and audio data from devices located within the controlled environment and organizes the video and audio data within profiles that allow for searches of the video and audio to be performed. The monitoring system analyzes the video and audio data and generates the profiles to include identified objects associated with the video and audio data.

20 Claims, 13 Drawing Sheets

(56) References Cited

U.S. PATENT DOCUMENTS

| | | |
|---|---|---|
| 2008/0211910 A1* | 9/2008 | Niem .............. G08B 13/19656 348/143 |
| 2009/0076823 A1 | 3/2009 | Collins |
| 2009/0080715 A1* | 3/2009 | van Beek ............. A61B 5/0059 382/118 |
| 2009/0216910 A1 | 8/2009 | Duchesneau |
| 2010/0034424 A1 | 2/2010 | Goossen |
| 2010/0299761 A1 | 11/2010 | Shapiro |
| 2011/0017863 A1 | 1/2011 | Goossen |
| 2012/0165976 A1 | 6/2012 | Cotner |
| 2013/0054010 A1* | 2/2013 | Holman ................. G06Q 10/10 700/232 |
| 2013/0110281 A1 | 5/2013 | Jones et al. |
| 2013/0197718 A1 | 8/2013 | Lee et al. |
| 2013/0279668 A1 | 10/2013 | Rokosky et al. |
| 2014/0018979 A1 | 1/2014 | Goossen et al. |
| 2014/0140575 A1 | 5/2014 | Wolf |
| 2014/0152422 A1 | 6/2014 | Breed |
| 2014/0177919 A1* | 6/2014 | Golan ............... G06K 9/00778 382/103 |
| 2014/0277691 A1 | 9/2014 | Jacobus et al. |
| 2015/0190925 A1 | 7/2015 | Hoffman et al. |
| 2015/0215254 A1 | 7/2015 | Bennett |
| 2015/0360365 A1 | 12/2015 | Fudaba et al. |
| 2016/0063987 A1 | 3/2016 | Xu et al. |
| 2016/0253889 A1* | 9/2016 | Keyton .................. G08B 21/22 340/539.13 |
| 2017/0053169 A1 | 2/2017 | Cuban |
| 2017/0092109 A1 | 3/2017 | Trundle et al. |
| 2017/0126691 A1* | 5/2017 | Arcese .................. G06F 9/4451 |
| 2017/0147976 A1 | 5/2017 | Koch et al. |
| 2017/0177925 A1 | 6/2017 | Volkart |
| 2017/0225336 A1 | 8/2017 | Deyle et al. |

OTHER PUBLICATIONS

International Search Report and Written Opinion directed to related International Patent Application No. PCT/US2016/067252, dated Mar. 16, 2017; 14 pages.

International Search Report and Written Opinion directed to related International Patent Application No. PCT/US2018/028354, dated Jul. 9, 2018; 16 pages.

International Search Report and Written Opinion directed to related International Patent Application No. PCT/US2018/027146, dated Jun. 28, 2018; 8 pages.

* cited by examiner

INMATE TRACKING SYSTEM IN A CONTROLLED ENVIRONMENT

BACKGROUND

Field

This disclosure relates to tracking inmates within a controlled environment through the use of video and audio analysis including object identification and audio recognition.

Background

In a controlled environment, such as a correctional facility or prison, keeping track of inmates and their behaviors is essential to maintaining the safety of the controlled environment and other inmates. Prior art methods can be either tedious, requiring manual inspection and interaction by guards, or expensive, requiring specialized devices, such as wristbands, attached to each inmate (which itself may require a guard to manually scan each device). Specialized devices may include radio-frequency chips to allow for easier tracking but such specialized devices require battery replacement or recharging. Moreover, specialized devices require expensive infrastructure to support the tracking of the specialized devices through the controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
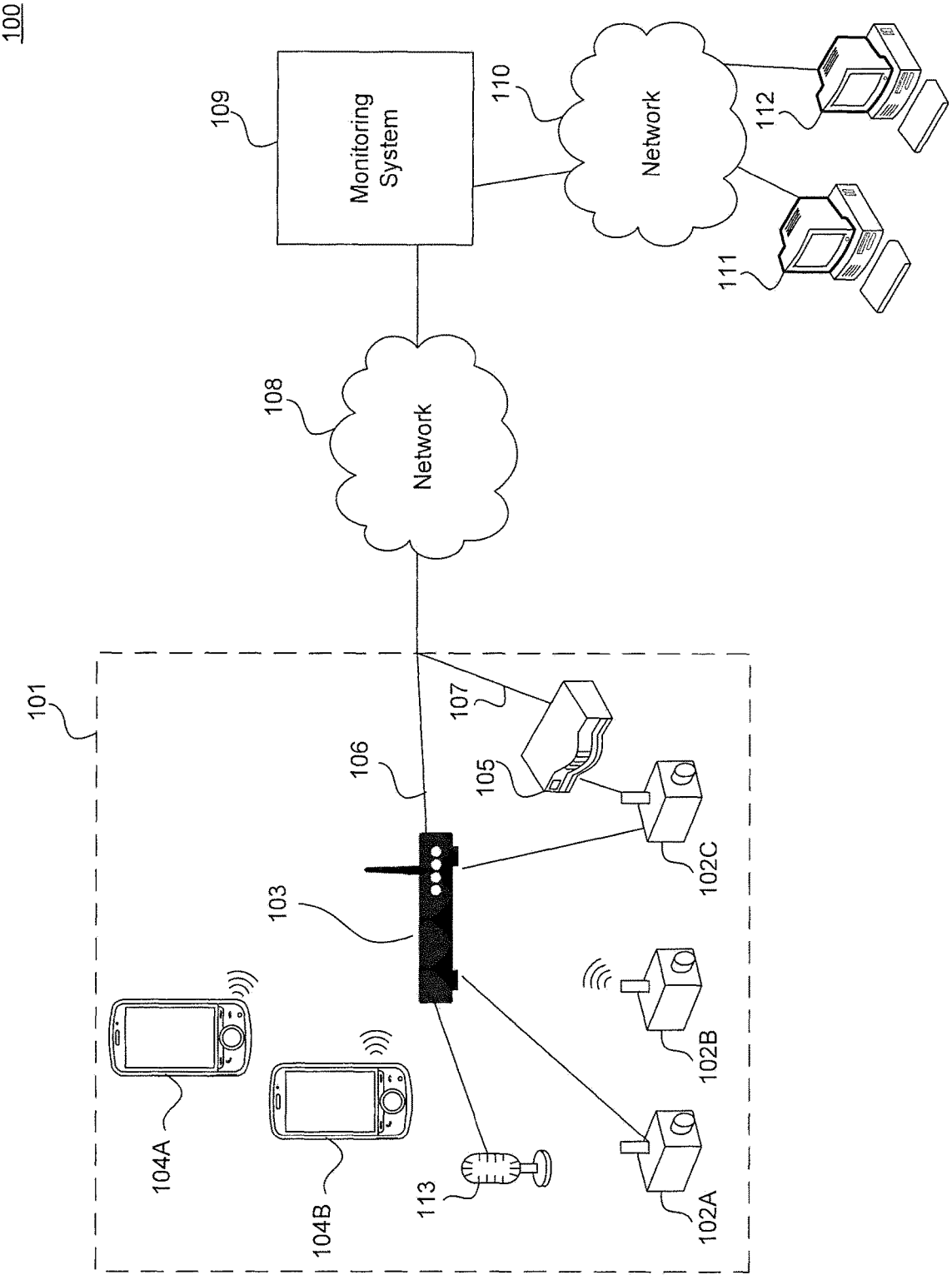
FIG. 1 illustrates a block diagram of an exemplary inmate tracking system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Inmate Tracking System

FIG. 1 illustrates a block diagram of an exemplary inmate tracking system 100, according to embodiments of the present disclosure. In some embodiments, inmate tracking system 100 includes a controlled environment 101, such as a prison, a monitoring system 109, and a network 108 that provides communications between controlled environment 101 and monitoring system 109. In some embodiments, monitoring system 109 is co-located with controlled environment 101, such as in a designated room within controlled environment 101. In other embodiments, monitoring system 109 may be located remotely from controlled environment 101. Network 108 may include any or all of a Local-Area Network (LAN), a Wide-Area Network (WAN), or the Internet, depending on the location of monitoring system 109 in relation to controlled environment 101. For example, network 108 is implemented as a LAN when monitoring system 109 is co-located with controlled environment 101. In another example, network 108 is implemented as a WAN or the Internet when monitoring system 109 is located at remotely from controlled environment 101.

In some embodiments, inmate tracking system 100 also includes network 110 and workstations 111 and 112. Although only two workstations are depicted in FIG. 1 for simplicity, any number of workstations are within the scope of the disclosure. Network 110 may include any or all of a Local-Area Network (LAN), a Wide-Area Network (WAN), or the Internet, depending on the location of workstation 111 and/or workstation 112 in relation to monitoring system 109. For example, network 110 is implemented as a LAN when workstation 111 and/or workstation 112 is co-located with monitoring system 109. In another example, network 110 is implemented as a WAN or the Internet when workstation 111 and/or workstation 112 is located remotely from monitoring system 109. Workstations 111-112 provide authorized personnel access to inmate tracking features of monitoring system 109 which are discussed in additional detail herein.

In some embodiments, controlled environment 101 includes video cameras 102A-102C, an access point 103, mobile devices 104A-104B, digital video recorder 105, and standalone microphone 113. Although only one access point, one digital video recorder, one standalone microphone, and three video cameras are depicted in FIG. 1 for simplicity, any number of access points, digital video recorders, and video cameras are within the scope of the disclosure. Similarly, although only two mobile devices are depicted in FIG. 1 for simplicity, any number of mobile devices are within the scope of the disclosure. Moreover, although only one monitoring system is depicted in FIG. 1 for simplicity, any number of monitoring systems are within the scope of the disclosure. For example, a number of monitoring systems can be distributed throughout controlled environment 101 and can communicate with each other over a network, such as network 108.

In some embodiments, video cameras 102A-102C are implemented throughout controlled environment 101. For example, one or more video cameras can be implemented in each room of controlled environment 101. Video cameras 102A-102B can provide and receive information through access point 103 and video camera 102C can provide information through digital video recorder 105. Access point 103 receives data from and provides data to network 108 through connection 106. Digital video recorder 105 receives data from and provides data to network 108 through connection 107. In some embodiments, connections 106 and 107 are wired connections, such as using a USB or Ethernet cable. In some embodiments, connections 106 and 107 are wireless connections, such as Bluetooth™ or Wi-Fi. Access point 103 can be implemented as any device that provides network access such as, but not limited to, a router, a smartphone, a tablet, or a laptop device. Digital video recorder 105 can be implemented as any device that records, processes, and stores video data received from video camera 102C. Both access point 103 and digital video recorder 105 can provide video data received from video cameras 102A-102C to monitoring system 109 through network 108.

In some embodiments, video cameras 102A-102C have wired and/or wireless communication capabilities. For example, video camera 102A communicates with network 108 through a wired connection, such as through a USB or Ethernet cable, with access point 103. Video camera 102B communicates with network 108 through a wireless connection, such as Bluetooth™ or Wi-Fi, with access point 103 which relays information to and from video cameras 102A and 102B. Video camera 102C can communicate with network 108 through a wired connection, such as through a USB or a video/power cable that provides both video communication and power capabilities to video camera 102C. In some embodiments, video cameras can be connected to both access point 103 and digital video recorder 105. For example, video camera 102C has communication interfaces that enable connections to both access point 103 and digital video recorder 105. Accordingly, video data from video camera 102C can be stored in digital video recorder 105 and transmitted through access point 103.

In some embodiments, any or all of video cameras 102A-102C can have infrared capability through the implementation of a thermal sensor. In some embodiments, any or all of video cameras 102A-102C have "smart" capability and can pre-process video data prior to sending the video data to monitoring system 109. Examples of pre-processing include but are not limited to performing preliminary object detection, image recognition, object tagging, behavior identification, and alert functionality. In such embodiments, the pre-processed information and the video data are transmitted to monitoring system 109. In some embodiments, in order to save bandwidth, only the pre-processed information is transmitted and the video data can be subsequently transmitted, such as at night when bandwidth usage of the system is lower.

Mobile devices 104A-104B are handheld devices and can be used by authorized personnel of controlled environment 101. In some embodiments, mobile devices 104A-104B are provided by controlled environment 101 to its employees, such as prison guards, for use to interact with and receive alerts as part of inmate tracking system 100. For example, mobile devices 104A-104B are in communication with monitoring system 109 through network 108 and can receive messages and other information sent by monitoring system 109. Mobile devices 104A-104B also are in communication with video cameras 102A-102C and can receive video streams and other information sent by video cameras 102A-102C. Mobile devices 104A-104B can communicate with network 108 through access point 103 using a wireless connection such as Bluetooth™ or Wi-Fi. Mobile devices 104A-104B can also have cellular networking capability, such as 4G and/or Long Term Evolution (LTE), and can communicate with monitoring system 109 through a cellular network.

In some embodiments, standalone microphone 113 can be implemented throughout controlled environment 101. For example, one or more standalone microphones can be implemented in each room of controlled environment 101. Standalone microphone 113 can provide and receive audio information through access point 103 and/or digital video recorder 105. Access point 103 receives data from and provides data to network 108 through connection 106. Digital video recorder 105 receives data from and provides data to network 108 through connection 107. Both access point 103 and digital video recorder 105 can provide audio data received from standalone microphone 113 to monitoring system 109 through network 108. In some embodiments, standalone microphone 113 has wired and/or wireless communication capabilities. For example, standalone microphone 113 communicates with network 108 through a wired connection, such as through a USB or Ethernet cable, with access point 103 and may also communicate with network 108 through a wireless connection, such as Bluetooth™ or Wi-Fi.

Figure 2A:
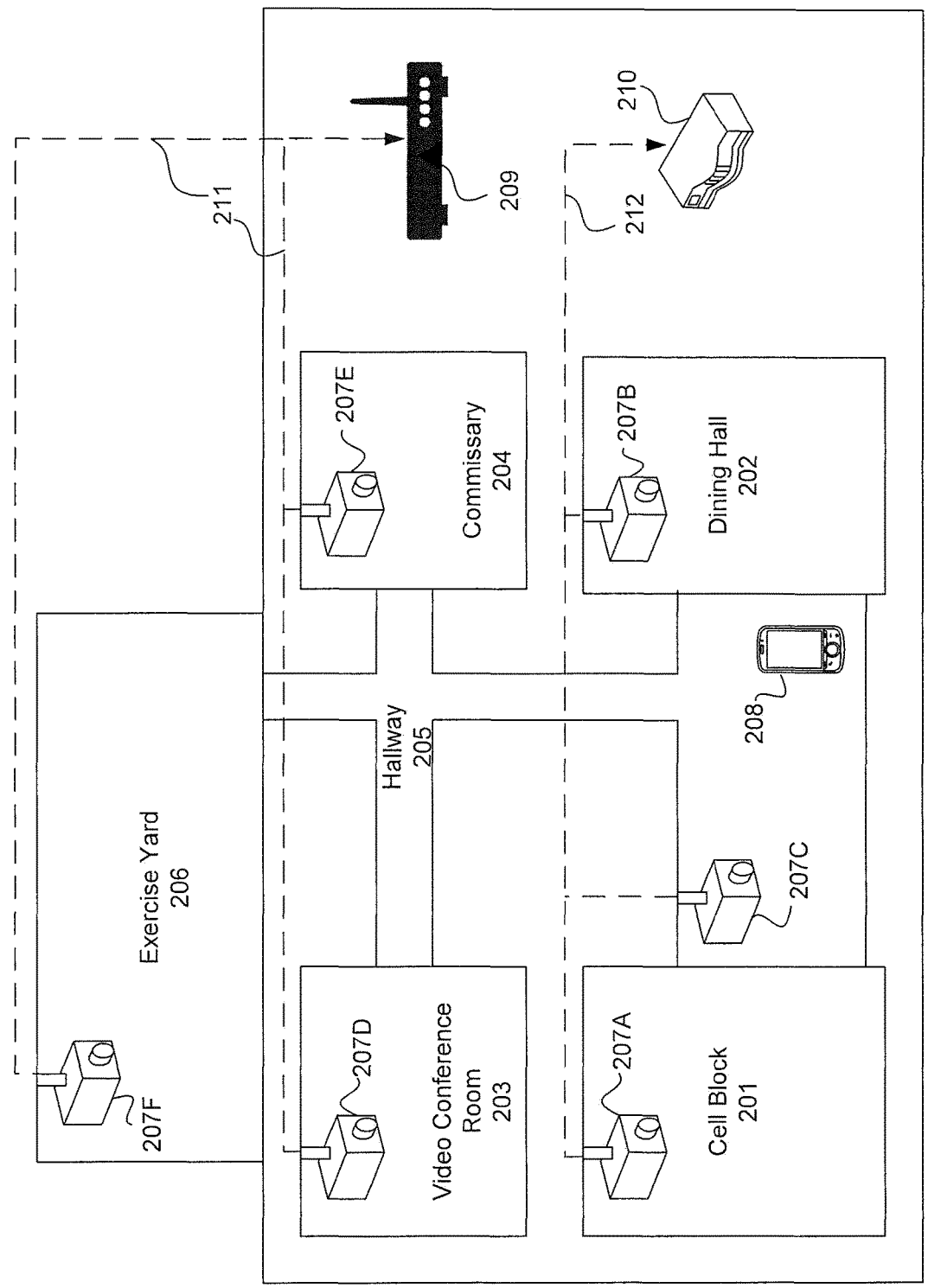
FIG. 2A illustrates a block diagram of an exemplary implementation of video cameras in a prison for use in the exemplary inmate tracking system of FIG. 1, according to embodiments of the present disclosure.

FIG. 2A illustrates a block diagram of an exemplary implementation of video cameras in a prison 200 for use in the exemplary inmate tracking system of FIG. 1, according to embodiments of the present disclosure. Prison 200 represents an exemplary embodiment of controlled environment 101 of FIG. 1. In some embodiments, prison 200 includes cell block 201, dining hall 202, video conference room 203, commissary 204, hallway 205, and exercise yard 206. While FIG. 2 depicts prison 200 with these defined areas, other implementations, layouts, number of areas, and types of areas are within the scope of the disclosure. Each defined area of prison 200 can be configured with a video camera for recording and transmitting video information for its area. For example, video camera 207A is installed in cell block 201, video camera 207B is installed in dining hall 202, video camera 207C is installed in hallway 205, video camera 207D is installed in video conference room 203, video camera 207E is installed in commissary 204, and video camera 207F is installed in exercise yard 206. FIG. 2 merely depicts an exemplary configuration of video cameras. Other configurations, such as increased number of cameras in each area and the placement of cameras in each area, are within the scope of the disclosure.

In some embodiments, prison 200 also includes mobile device 208, access point 209, and digital video recorder 210 which represent an exemplary embodiments of mobile devices 104A-104B, access point 103, and digital video recorder 105 of FIG. 1 respectively. Although only one mobile device, one access point, and one digital video recorder are depicted in FIG. 2 for simplicity, any number of mobile devices, access points, and digital video recorders within prison 200 are within the scope of the disclosure. In some embodiments, mobile device 208 can be implemented as, but not limited to, a smartphone, a tablet, or a handheld device. In some embodiments, prison 200 provides mobile device 208 to authorized personnel such as a guard. Access point 209 provides network communication to devices such as video cameras 207D-207F and mobile device 208 in prison 200 including receiving and transmitting video data from video cameras 207C-F. Digital video recorder 210 records and transmits video data from video cameras 207A-207C. Network communication may include wireless connections, such as Bluetooth™ or Wi-Fi connections, or a wired connection such as a USB cable and a Ethernet cable. In prison 200, video cameras 207A-207F provide video data (and, in some embodiments, audio data) to monitoring system 109 for tracking the movements and determining locations of people, including inmates and guards, within prison 200. Functions of monitoring system 109 with respect to video (and audio analysis) are discussed further with respect to FIG. 3.

Figure 2B:
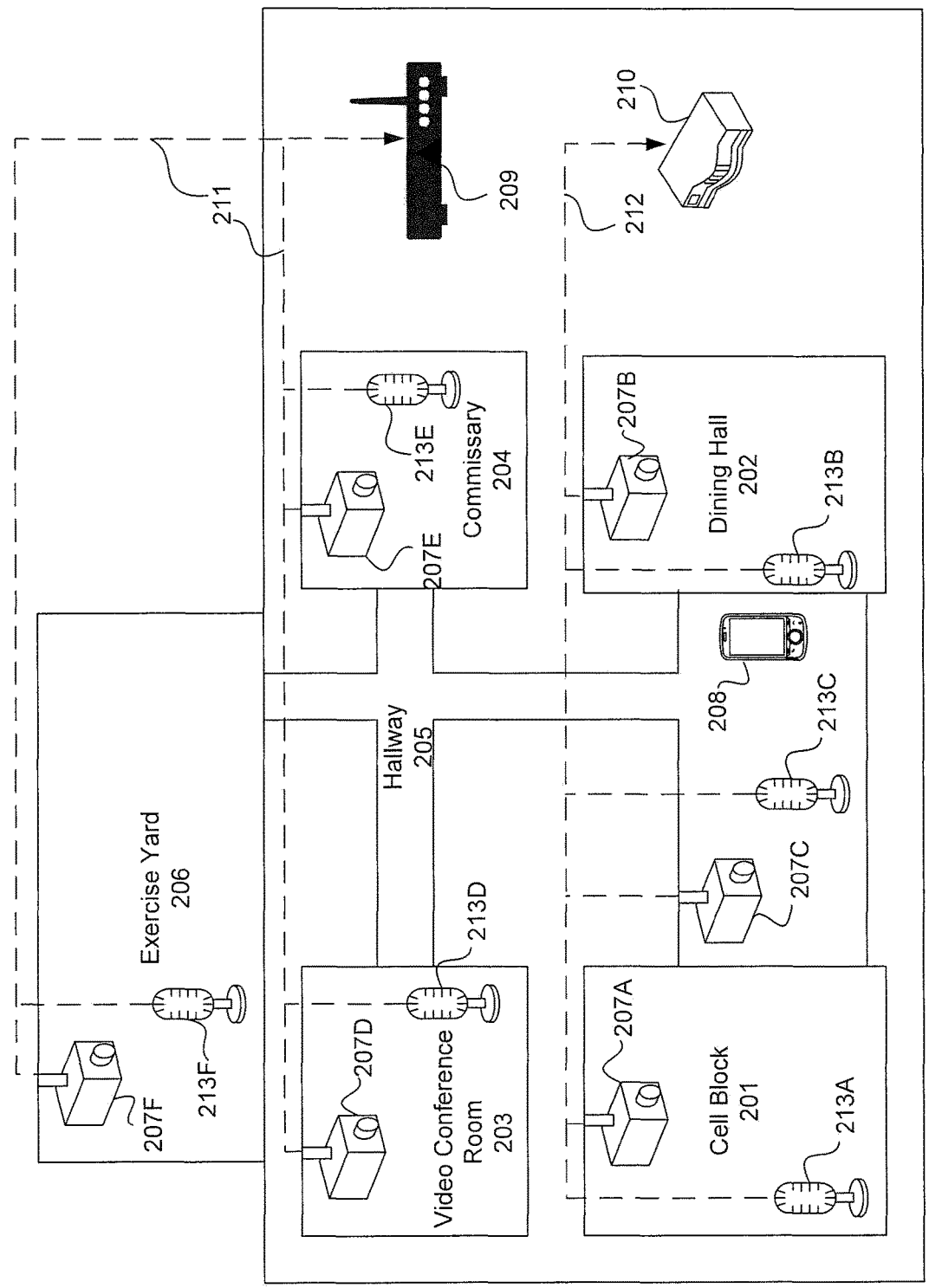
FIG. 2B illustrates a block diagram of an exemplary implementation of video cameras and standalone microphones in a prison for use in the exemplary inmate tracking system of FIG. 1, according to embodiments of the present disclosure.

FIG. 2B illustrates a block diagram of an exemplary implementation of video cameras and standalone microphones in a prison 250 for use in the exemplary inmate tracking system of FIG. 1, according to embodiments of the present disclosure. Prison 250 represents an exemplary embodiment of controlled environment 101 of FIG. 1. In some embodiments, prison 250 has a similar implementation of devices as prison 200, discussed with respect to FIG. 2A, but further includes standalone microphones 213A-213F.

Standalone microphones 213A-213F can be configured to detect and record sounds at various locations of prison 250. For example, in some embodiments, standalone microphones 213A-213F are positioned in each area of prison 250. Other implementations, such as the number of standalone microphones, their positions with prison 250, and the layout of the prison 250 are within the scope of the invention.

Standalone microphones 213A-213F can record surrounding sounds proximate to their location and independently of video cameras 207A-207F. In some embodiments, standalone microphones 213A-213F are connected to access point 209 and/or digital video recorder 210. When connected to either access point 209 or digital video recorder 210, standalone microphones 213A-213F provide recorded audio data to monitoring system 109 over network 108 for further analysis. In prison 250, video cameras 207A-207F and standalone microphones 213A-F provide video data and audio data to monitoring system 109 for tracking the movements and determining locations of people, including inmates and guards, within prison 250. Functions of monitoring system 109 with respect to video and audio analysis are discussed further with respect to FIG. 3.

When connected to access point 209, standalone microphones 213A-213F provide recorded audio data for storage in monitoring system 300, such as in database 336. When connected to digital video recorder 210, standalone microphones 213A-213F provide recorded audio data for storage in digital video recorder 210 for later retrieval by monitoring system 300. For example, monitoring system 300 can retrieve recorded audio data from digital video recorder 105 at a predetermined schedule such as on a specific day or days at a specific time or times. Standalone microphones 213A-213F may further include automatic gain control (AGC) for increasing the microphones ability to detect and record sounds in a variety of ambient noise locations.

Figure 2C:
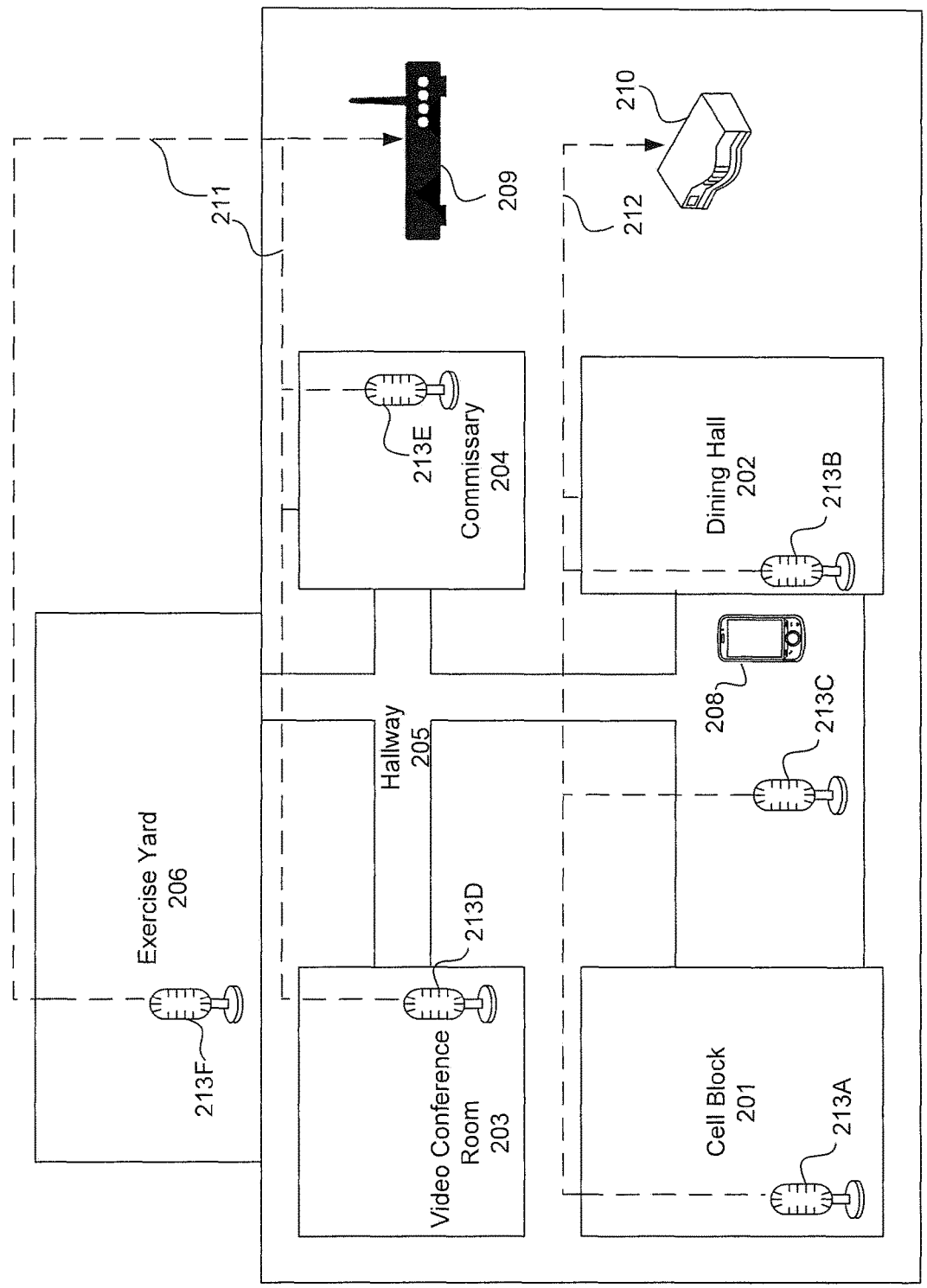
FIG. 2C illustrates a block diagram of an exemplary implementation of standalone microphones in a prison for use in the exemplary inmate tracking system of FIG. 1, according to embodiments of the present disclosure.

FIG. 2C illustrates a block diagram of an exemplary implementation of standalone microphones in a prison 280 for use in the exemplary inmate tracking system of FIG. 1, according to embodiments of the present disclosure. Other implementations, such as the number of standalone microphones, their positions with prison 250, and the layout of the prison 250 are within the scope of the invention.

Prison 280 represents an exemplary embodiment of controlled environment 101 of FIG. 1. Prison 280 has a similar layout as prison 200, discussed with respect to FIG. 2A, but only includes standalone microphones 213A-213F. As discussed with respect to FIG. 2B, standalone microphones 213A-213F may be connected to access point 209 and/or digital video recorder 210. In prison 290, standalone microphones 213A-F provide audio data to monitoring system 109 for tracking the movements and determining locations of people, including inmates and guards, within prison 250. Functions of monitoring system 109 with respect to audio analysis are discussed further with respect to monitoring system 300 in FIG. 3. Standalone microphones 213A-213F may further include automatic gain control (AGC) for increasing the microphones ability to detect and record sounds in a variety of ambient noise locations.

Exemplary Monitoring System

Figure 3:
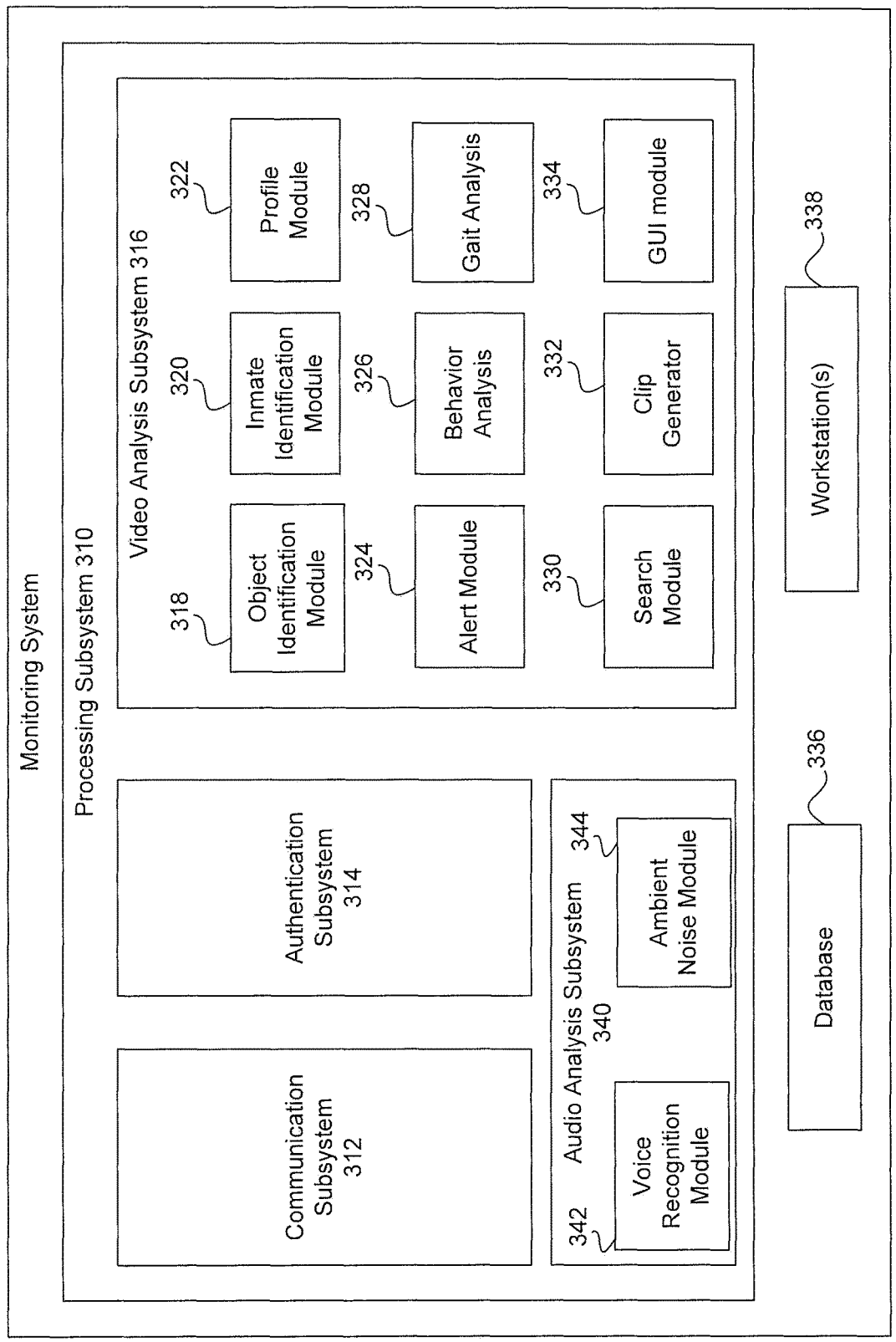
FIG. 3 illustrates a block diagram of an exemplary monitoring system for use in the exemplary inmate tracking system of FIG. 1, according to embodiments of the present disclosure.

FIG. 3 illustrates a block diagram of an exemplary implementation of a monitoring system 300 for use in the exemplary inmate tracking system of FIG. 1, according to embodiments of the present disclosure. In some embodiments, monitoring system 300 represents an exemplary embodiment of monitoring system 109 of FIG. 1. Monitoring system 300 includes but is not limited to processing subsystem 310, database 336, and one or more workstation(s) 338. Processing subsystem 310 includes one or more processors, computers, or servers identified as subsystems and can be constructed as individual physical hardware devices, or as virtual devices, such as a virtual server. The number of processing subsystems can be scaled to match the number of simultaneous user connections desired to be supported by an inmate tracking system such as inmate tracking system 100 of FIG. 1. Processors of processing subsystem 310 control the operation of communication subsystem 312, authentication subsystem 314, video analysis subsystem 316, and audio analysis subsystem 340.

In an embodiment, communication subsystem 312 controls the routing of video data between devices in prison 200 and monitoring system 300. Further, communication subsystem 312 logs information related to the video data, including but not limited to timestamps, identification of inmates within the video data, identification of behavior within the video data, and stores the logs and video data as files. The files stored by communication subsystem 312 can be stored indefinitely for use by monitoring system 109 in monitoring and investigation of inmates in prison 200. In an embodiment, communication subsystem 312 is configured to receive video data from video cameras 102A-102C and communicate with mobile devices 104A-104B.

Authentication subsystem 314 collects and stores identity data of inmates within inmate tracking system 100. Identity data includes but is not limited to at least one of a username and password data, challenge questions, challenge answers, biometric data, device data such as make and model of a communication device, and/or location data. Biometric data includes one or more of a finger print, a hand print, a voice sample, an iris or retinal sample, a facial image of the user (2D or 3D), a gait identification, a hand geometry, a signature identification, an infrared camera identification, or any other biometric as deemed appropriate. Authentication subsystem 314 is further configured to facilitate a secure communication between video cameras 207A-207F within prison 200 and monitoring system 300.

In some embodiments, authentication subsystem 314 also includes identity data of authorized personnel of inmate tracking system 100 utilizing mobile devices 104A-104B. Authentication subsystem 314 ensures that mobile devices 104A-104B are utilized by the correct personnel and allows mobile devices 104A-104B to log into inmate tracking system 100. Once logged in, mobile devices 104A-104B can receive alerts from monitoring system 109, can receive video feeds from video cameras 102A-102C, and otherwise access tracking functionality provided by monitoring system 109.

Video analysis subsystem 316 further includes, but is not limited to, object identification module 318, inmate identification module 320, profile module 322, alert module 324, behavior analysis 326, gait analysis 328, search module 330, clip generator 332, graphical user interface (GUI) module 334. Although multiple modules are depicted in FIG. 3, any number of modules for performing the features of video analysis subsystem 316 is within the scope of the disclosure. For example, video analysis subsystem 316 can include a single module for performing the features described herein. In some embodiments, video analysis subsystem 316 receives and processes video data received from video cameras in inmate tracking system 100. Processing the video data can include, but is not limited to, identifying objects within the video data, performing image recognition of the data, performing requested searches of inmates or identifiers, performing predefined analysis routines on video data, and updating inmate profiles based on the analyzed video. Objects are any identifiable item within video data and can include but are not limited to persons (e.g. inmates, guards), identifying marks (e.g., tattoos), physical objects (e.g., knives), and behaviors (e.g., fights) occurring within video data.

In some embodiments, object identification module 318 processes video data by detecting objects within each frame of the video to differentiate between people and objects within the video data. Object identification module 318 identifies object identification information within the video data. Examples of object identification information include but are not limited to facial data and object data. Object identification module 318 identifies facial data of people within the video data and transmits the identified facial data to inmate identification module 320 to identify the person or persons in the video. Object data within a video can include identifying marks of inmates such as serial numbers located on the uniforms, tattoos, and scars, as well as detecting illegal or legal objects within the prison such as weapons or mobile devices. Object identification module 318 transmits any object data, such as possible identifying marks to inmate identification module 320 to identify the person or persons in the video. Video data also includes a camera identifier of the camera that captured the video. The camera identifier can be used by video analysis subsystem 316 to determine the location where the video was captured.

Object analysis performed by object identification module 318 can include retrieving images stored in database 336 and comparing object data from the video with the retrieved images. Images in database 336 can include images of allowed and restricted objects that have been approved by administrators of the controlled environment. For example, images of allowed objects can include, but are not limited to, approved mobile devices. Images of restricted objects can include, but are not limited to, contraband items such as mobile devices and weapons.

Figure 5:
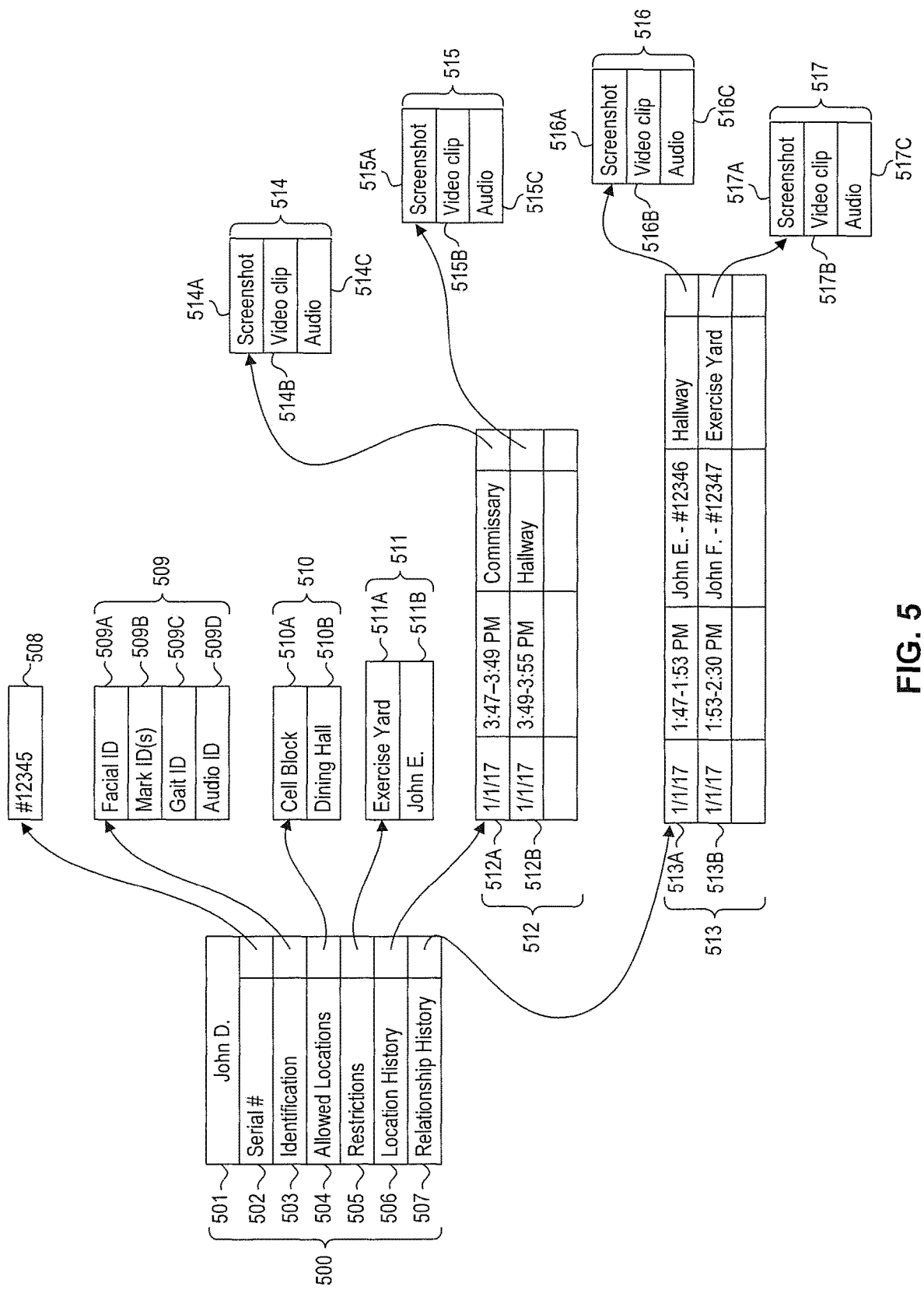
FIG. 5 illustrates an exemplary inmate profile for use in the exemplary inmate tracking system of FIG. 1, according to embodiments of the present disclosure.

In some embodiments, assigning specific objects to an inmate includes associating images of the specific objects to the inmate's profile (as discussed further with respect to FIG. 5). Accordingly, objects identified by object identification module 318 and inmates identified by inmate identification module 320 (discussed further below) can be cross-referenced with the inmate's profile to determine whether the held object is associated with the inmate, with another inmate, or is contraband. For example, monitoring system 300 receives a video that includes a clip of an inmate holding a mobile device. Object identification module 318 can identify the mobile device and inmate identification module 320 can identify the inmate. Either object identification module 318 or inmate identification module 320 can then determine, based on the inmate's profile whether the identified mobile device corresponds to the identified inmate. As further discussed below with respect to alert module 324, alerts can be conditioned on detection of contraband items or objects in possession by the wrong inmate.

In some embodiments, inmate identification module 320 receives possible identifying information, such as facial data, serial numbers, tattoos, and scars, from object identification module 318. Inmate identification module 320 attempts to match the received identifying information to stored identifying information. Stored identifying information can be stored within inmate profiles in any database accessible to monitoring system 300 such as database 336. Inmate profiles are described in more detail with regard to FIG. 5. In some embodiments, inmate identification module 320 formats the identifying information so that it can be compared to the stored identifying information. Facial data can include but is not limited to facial data points representing the characteristics of a person's face such as distances between eyes, nose, and mouth and shapes of the eyes, nose, mouth, jaw. Facial data can also include a facial identifier created from, for example, a hash function, of the facial data points.

Inmate identification module 320 can send the formatted (if necessary) identifying information to profile module 322 which searches data in profiles stored in database 336. For example, upon receiving facial data, inmate identification module 320 can format the facial data into a format that can be compared with facial data stored in inmate profiles. For example, facial data stored in inmate and location profiles may include a different number of facial data points or store the facial data as a facial identifier. If the facial data from object identification module 318, inmate identification module 320 can convert the facial data into a facial identifier that can be used by profile module 322. Profile module 322 performs the comparison between the facial data received from inmate identification module 320 and facial data stored in inmate and location profiles. Profile module 322 can return a list of possible matches and a confidence score which indicates the similarity between the facial data of the video data and in the inmate and location profiles.

Inmate identification module 320 can also attempt to identify persons in video through other identifying marks such as identification placed on uniforms or body marks. For example, object identification module 318 can detect certain numbers or marks on a uniform and transmit these numbers to inmate identification module 320. Inmate identification module 320 can determine the numbers and submits a request to profile module 322 to determine whether the determined numbers correspond to any inmate's serial number by searching inmate and location profiles for the determined numbers. Similar search functionality applies for other identifying marks such as tattoos or scars.

Inmate identification module 320 can also maintain a count of and track inmates within a specific location over a defined time duration. For example, inmates can be required to walk past video camera 207B in dining hall 202 before being allowed to obtain their food. Inmate identification module 320 can confirm the identity of each inmate before being allowed in line. In this manner, inmate identification module 320 can track the number of inmates in dining hall 202 and prevent inmates from doubling back in line in an attempt to obtain a second meal. The information from inmate identification module 320 is stored in appropriate inmate profiles based on the identified inmates in the video data and also is used by other modules in video analysis subsystem 316. For example, if inmate identification module 320 identifies that an inmate is attempting to enter the line in dining hall 202 a second time, alert module 324 (discussed further below) can send an appropriate alert message to authorized personnel based on the relevant alert rule.

While previous discussion of inmate identification module 320 has been limited to identifying inmates, inmate identification module 320 can also identify employees of prison 200 such as the guards based on the same principles of facial recognition and object identification.

Profile module 322 also updates inmate and location profiles based on the identified information from inmate identification module 320. For example, if inmate identification module 320 identifies a certain inmate in a certain area of profile module 322, profile module 322 will update the inmate's profile to indicate the inmate's location history as well as the location profile to identify the inmate. The location history can include the name of the area, the time and date that the inmate was detected in the area, a screen shot of the inmate from the video, and/or a clip of the video in which the inmate was identified.

In some embodiments, alert module 324 sends alerts to designated officials such as guards having mobile devices 104A-104B and/or workstations 111-112. Alerts can be triggered based on rules established my administrators of controlled environment 101. For example, rules can specify sending alert messages based on conditions such as detecting a certain inmate in an unauthorized area of controlled environment 101, detecting restricted behavior by an inmate or inmates, detecting that a certain inmate is not present in a mandatory area, such as his cell, at a specific time, detecting that certain persons of different known gangs are in proximity to each other. Alert module 324 can store the alert rules in memory internal to alert module 324 or external memory such as database 336. Alert rules can be location-based rules (e.g., an inmate is not allowed in video conference room 203 or exercise yard and authorized personnel should be alerted when the inmate is detected in these locations), behavior-based rules (e.g., authorized personnel are to be alerted when behavior analysis 326 detects a potential fight), relationship-based rules (e.g., authorized personnel are to be alerted when an inmate is detected near another inmate), or object-based rules (e.g., detection of contraband, detection of objects held by the incorrect inmate).

In some embodiments, behavior analysis 326 receives video data from object identification module 318 and, utilizing behavior algorithms, analyzes the video data to identify any behaviors in the video data. In some embodiments, behavior analysis 326 performs its analysis in real-time based on video streamed to monitoring system 300. Real-time analysis of behavior in video can be linked to rules in alert module 324 and alert messages can be triggered based on behavior-based rules. Behaviors include, but are not limited to, fights, suicide attempts, threats, and assaults. Behavior algorithms can work with other modules of video analysis subsystem 316 to identify behaviors based on, for example, a predefined number of people within the video, the location in which the video was captured, the identified people within the video, and the types of movements occurring in the video.

For example, inmate identification module 320 can detect a number of different people within a video, profile module 322 can identify the different people as being involved in different known gangs who have a history of hostile behavior, and behavior analysis 326 can determine that the different people are within a certain proximity of each other or are walking towards each other. Behavior algorithms can utilize this information to determine that a fight is occurring or is imminent. As another example, behavior algorithms can detect a number of fast movements occurring in the video data of video camera 207B in dining hall 202. Based on these factors, behavior algorithms can determine that a fight is occurring and sends the determination to alert module 324 for triggering the appropriate alert messages and to profile module 322 for updating profiles to indicate their involvement in the fight and the location where the fight is taking place.

In some embodiments, gait analysis 328 attempts to identify persons based on the detected gait in video data. Inmate identification module 320 can detect the gait or walking mechanics of a person in the video data and send this detected information to gait analysis 328. Gait analysis 328 then compares the received detected information to stored gait information for each prisoner and employee of controlled environment 101. Gait information of each inmate can be stored each inmate's inmate profile (e.g., 500 in FIG. 5). Gait information includes data points regarding the inmate's biomechanics while walking such as the positioning of the inmate's arms, legs, feet, head, and body. Moreover, the stored gait information in the inmate profile can be continuously updated over time while the inmates are in prison. For example, gait analysis 328 can analyze each video of the inmate walking in prison captured by video cameras determine data points regarding the inmate's biomechanics while walking. Gait analysis 328 can then update the inmate's profile based on the additional data points. Such a feature accommodates changes to an inmate's gait such as from an injury.

In some embodiments, search module 330 receives search requests from authorized personnel such as through workstation(s) 338 and/or mobile devices 104A-104B. A search request can include the name of an inmate and/or employee, the names of multiple inmates and/or employees an identifying mark such as a tattoo, a specific location in prison 200 (e.g., cell block 201, dining hall 202, or hallway 205), a specific time window (e.g., a date and time period), and a specific event (e.g., a fight, video conferences). Search requests may include a text entry such as typing an inmate's name through a browser or application on workstation(s) 338 and/or mobile devices 104A-104B, an image such as a scanned photo or photo downloaded from an external mug shot database. For example, a search request can include the names or identifying information for two inmates and search module 330 searches stored video data for any video that includes the two inmates.

In some embodiments, clip generator 332 processes video data into shorter video clips based on people identified in the video data and the type of behavior identified in the video data. The shorter video clips can then be stored in inmate profiles based on the identified inmates and/or in database 336. Processing the video data into shorter video clips can reduce the storage needed to store the video data and can increase the speed for searching. For example, clip generator 332 can generate video clips of an certain inmate based on received video data and stores the generated video clips in the inmate's profile for easy access and retrieval. Similarly, clip generator 332 can generate video for any behavior such as fights which allows authorized personnel to quickly search for all clips that include fights.

In some embodiments, GUI module 334 adds visual annotations to stored video data and generated video clips to aid authorized personnel during a search. GUI module 334 receives identification information from inmate identification module 320 and adds visual annotations such as a tag placed adjacent to the identified inmate in the video data or clip.

In some embodiments, processing subsystem 310 further includes an audio analysis subsystem 340 for processing audio data from video cameras 207A-F and/or standalone microphones 213A-F. In some embodiments, audio analysis subsystem 340 includes voice recognition module 342 and ambient noise module 344. Analysis of audio data can include voice recognition, performed by voice recognition module 342. For example, audio analysis subsystem 340 can parse audio data to detect voices within the audio data, generates an audio clip that includes the detected voice, and provides the generated audio clip to inmate identification module 320. In some embodiments, inmate identification module 320 can perform voice recognition through stored biometric information. For example, inmate identification module 320 can retrieve a voice sample from inmate profiles and compare the voice sample with the voices identified in the video data. Inmate identification module 320 can then identify an inmate on the basis of this comparison.

Audio analysis can further include decibel detection, performed by ambient noise module 344. For example, video analysis subsystem 316 can detect the decibels of sound recorded in the video and perform voice recognition of voices in the video data. The decibels and voice recognition can be used by behavior analysis 326 as part of its determination as to the type of behavior in the video data (e.g., loud sounds can indicate a fight).

Audio data provided by standalone microphones 213A-F further includes location information within a prison. Location information of standalone microphones 213A-F allows monitoring system 300 to correlate analysis of audio data with corresponding analysis of video data based on a specific location. Location information of standalone microphones 213 further allows monitoring system 300 to tag audio data based on location and store the audio data in appropriate profiles for later retrieval. Audio data further includes timestamp information to indicate the date and time of the audio data.

In some embodiments, audio data can be used to supplement video analysis performed by video analysis subsystem 316. Audio analysis subsystem 340 can perform audio analysis independently of video analysis and the results of the analysis by audio analysis subsystem 340 can be used to increase confidence and reduce false positives in the results of analysis by video analysis subsystem 316. For example, video analysis subsystem 316 can analyze video data (e.g., image recognition) to determine the identities of inmates within the video data. Similarly, audio analysis subsystem 340 can analyze audio data (e.g., audio recognition) to also determine the identifies of inmates within the audio data. The results of the image recognition and audio recognition can be compared to increase or decrease confidence by reducing false positives in the results of the analysis.

In some embodiments, audio analysis subsystem 340 can perform real-time monitoring and analysis of audio data provided by standalone microphones 213A-F. Transmitting video data has greater bandwidth requirements than transmitting audio data because audio data is typically smaller in file size compared to video data. Accordingly, some prisons may desire to rely primarily on audio data analysis to reduce strain on the prison's network infrastructure. Accordingly, monitoring system 300 can implement tracking features through analysis of audio data. For example, audio analysis subsystem 340 performs location determination through audio recognition of audio data received from a microphone within standalone microphones 213A-213F to identify inmate or inmates within a certain area of a prison. Audio analysis subsystem 340 can perform movement tracking by correlating identified inmates, the location information of standalone microphones 213A-F, and timestamp information of the audio data to estimate the movement of inmates through different areas of the prison.

Database 336 includes any number of databases and/or servers, and stores and organizes data in a relational database. Database 336 runs a database management system, such as MYSQL™, to provide an example. Database 336 also includes organized data such that respective identity data, authentication data, jurisdictional requirements and rules, and settings that are indexed and linked to allow access to video data for each of the parties. Database 336 can store analyzed audio data, unprocessed audio data, unprocessed video data, analyzed video, generated audio clips, generated video clips, inmate profiles, and any other information associated with inmate tracking system 100. Database 336 also stores metadata associated with videos and audio. Metadata of videos include inmates identified within the videos, locations of video cameras where the videos were recorded, and any other objects or identifying information identified within the videos as determined by video analysis subsystem 316 and audio analysis subsystem 340.

Workstation(s) 338 provides access to features of monitoring system 300. Workstation(s) 338 includes applications that allow for authorized personnel to search for video data and/or clips based on search queries, view real-time video data, view stored video data, receive alert messages, and provide alert conditions for triggering the alert messages.

Exemplary Video Camera

Figure 4:
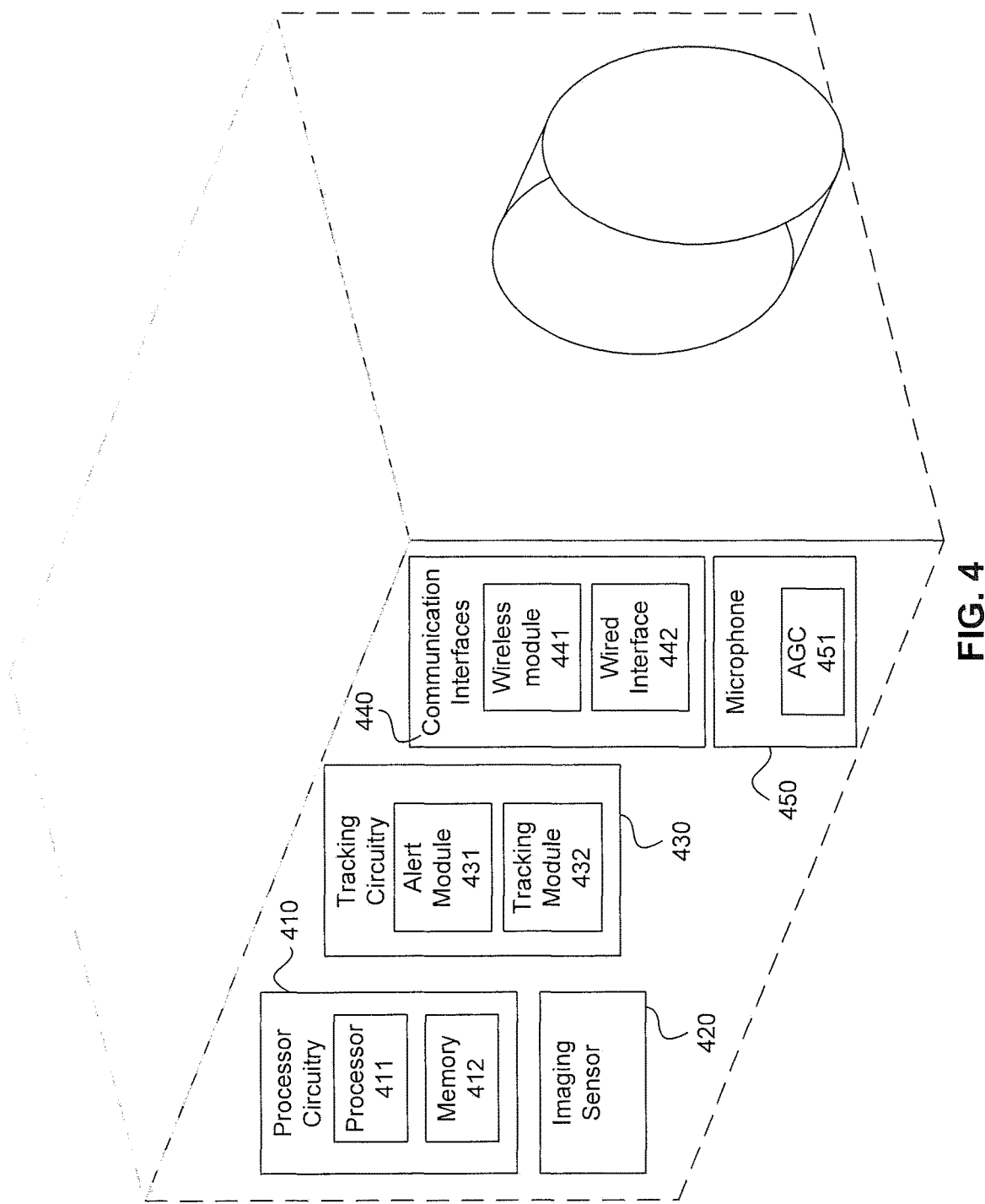
FIG. 4 illustrates an exemplary video camera for use in the exemplary inmate tracking system of FIG. 1, according to embodiments of the present disclosure.

FIG. 4 illustrates a block diagram of an exemplary implementation of a video camera 400 for use in the exemplary inmate tracking system of FIG. 1, according to embodiments of the present disclosure. In some embodiments, video camera 400 represents an exemplary embodiment of video cameras 102A-102C of FIG. 1. Video camera 400 includes but is not limited to processor circuitry 410, imaging sensor 420, tracking circuitry 430, communication interfaces 440, and microphone 450.

Processor circuitry 410 includes one or more processors 411, circuitry, and/or logic configured to control the overall operation of video camera 400, including the operation of imaging sensor 420, tracking circuitry, communication interfaces 440, and microphone 450. Processor circuitry 410 further includes memory 412 to store data and instructions. Memory 412 may be any well-known volatile and/or non-volatile memory that is removable and/or non-removable.

Imaging sensor 420 depends on the type of video camera 400. In some embodiments, imaging sensor 420 can be implemented as a charge coupled device (CCD) or complementary metal oxide semiconductor) CMOS sensor for video camera 400. In some embodiments, if video camera 400 is an infrared camera, imaging sensor 420 is implemented as a CCD sensor, a CMOS sensor, or a specialized infrared sensitive image sensor.

In some embodiments, video camera 400 includes tracking circuitry 430 that can perform certain inmate tracking features such as object detection and sending alerts. Tracking circuitry 430 includes alert module 431 and tracking module 432. Alert module 431 can be configured to transmit alerts based on certain conditions detected by tracking module 432. In some embodiments, video camera 400 lacks the processing capability of monitoring system 300 and therefore only performs certain real-time analysis of video data in tracking module 432. A function of tracking module 432 includes detecting the presence of a person or persons within video data. Alert module 431 can include a rule that triggers an alert conditioned on the detection of any person within a restricted area during a specific time of day (e.g., hallway 205 at 3:00 AM). By having video camera 400 perform this preliminary analysis, alert messages can be transmitted more quickly to authorized personnel.

In some embodiments, in order to save bandwidth over a network, tracking module 432 can condition the transmission of video data from video camera 400 to monitoring system 300 based on detected activity (e.g., detecting the movement of a person) in a video. For example, video camera 400 does not stream video data to monitoring system until tracking module 432 detects activity in the video. When the detected activity is detected, tracking module 432 can send a signal to processor circuitry 410 to transmit the video data from video camera 400 to monitoring system 300. In some embodiments, video camera 400 can buffer a predetermined amount of video in memory 412. Video transmitted by processor circuitry 410 can include real-time video as well as any video buffered by memory 412. Moreover, tracking module 432 also detect when the activity has stopped (e.g., detecting that there has not been any movement) and can signal processor circuitry 410 to stop transmitting video data.

In some embodiments, communication interfaces 440 includes wireless module 441 and/or wired interface 442. Wireless module 441 enables video camera 400 to communicate with a network through a wireless connection such as such as Bluetooth™ or Wi-Fi. Wired interface 442 enables video camera 400 to communicate with a network through a wired connection, such as through a USB, Ethernet cable, or video/power cables.

In some embodiments, video camera 400 includes a microphone 450 which can be utilized to record sound data associated with recorded video data. Audio data from video camera 400 can be analyzed by audio analysis subsystem 340 of monitoring system 300 as discussed above with respect to FIG. 3. In some embodiments, microphone 450 can further include an automatic gain control module 451 which increases the ability of microphone 450 to detect audio activity in low ambient noise locations.

Exemplary Profiles

FIG. 5 illustrates an exemplary inmate profile 500 for use in the exemplary inmate tracking system of FIG. 1, according to embodiments of the present disclosure. Inmate profile 500 allows inmate profile system 100 store analyzed video data that enables search and retrieval features. Inmate profile 500 allows information in video data to be organized and displayed to authorized personnel in a more efficient manner than simply searching through an entire video stream. Inmate profile 500 enables inmate profile system 100 to store specific video data and associate the video data to terms or metadata that can be searched using, for example, workstation(s) 338. Inmate profile 500 can be associated with each inmate in controlled environment 101. Inmate profile 500 merely shows an exemplary embodiment for an exemplary inmate. It should be understood that inmate profiles are customized based on the specific information for each inmate. Accordingly, inmate profiles can vary for each inmate. The discussion of the data in inmate profile 500 is merely to highlight an exemplary organization of an inmate's information.

Search requests of inmates that include search terms such as the inmate's name or identifying marks are compared with the information stored in inmate profile 500 in order to determine whether there is a match. A match can result in retrieving the associated video data such as one or more video clips that are associated with the search terms.

Data in inmate profile 500 can be updated automatically by profile module 322 of monitoring system 300 and/or manually by authorized personnel from workstation(s) 338. For example, profile module 322 can receive identification information regarding the inmate, a screen shot and clip of the inmate, and other data from modules in video analysis subsystem 316. Profile module 322 updates inmate profiles based on this received data. Additionally, authorized personnel may manually populate or update inmate profiles such as at the time of booking or when establishing alert rules for the specific inmate. In some embodiments, each inmate has a corresponding inmate profile stored in, for example, database 336 of monitoring system 300.

Exemplary inmate profile 500 identifies the name 501 of the inmate and includes additional fields and rules including but not limited to serial number field 502, identification field 503, allowed locations field 504, restrictions field 505, location history field 506, and relationship history field 507. Other types of fields and rules associated with an inmate are within the scope of the invention. For example, inmate profile 500 can include associated object images of objects that have been assigned to the inmate. Examples of objects include but are not limited to mobile devices that been provided for use by the inmate. Inmate profile 500 can store information in database 336 in monitoring system 300 in any manner including as a plurality of fields in a table of a database, as a linked listed structure, or as an array.

Serial number field 502 is associated with data element 508 which holds the inmate's serial number. The serial number can be manually input by authorized personnel through workstation(s) 338.

Identification field 503 is associated with identification data element 509 which can hold any biometric information associated with the inmate such as facial identifier 509A, identifying marks 509B, gait mechanics 509C, and an audio identifier 509D. Identification field 503 can be input and updated at any time. For example, facial identifier 509A can be generated from the inmate's mug shot when the inmate is booked into controlled environment 101. In some embodiments, facial identifier 509A is generated from facial data points extracted from an image or images of the inmate. In some embodiments, facial identifier 509A is the result of hashing or performing comparable processing to reduce the facial data points into a single unique identifier. In some embodiments, facial identifier 509A is represented as a number of separate facial number data points. Facial identifier 509A can be used during an inmate identification process, as further discussed in FIG. 7, as a basis of comparison with facial data points retrieved from video data.

Similarly, mark identifier(s) 509B that represent an inmate's marks such as tattoos or scars can be automatically input into inmate profile 500 through object identification of images taken of the inmate at booking. For example, as part of the booking process, images of the inmates identifying marks (and face, as discussed above) can be taken. These images are provided to the monitoring system 300 which can extract the necessary data points for storage in inmate profile 500 and which form the basis of comparison when searches are performed. For example, similar to generating the facial identifier 509A, monitoring system 300 can generate mark identifier(s) 509B based on mark data points extracted from the images. In some embodiments, mark identifier(s) 509B are the result of hashing or performing comparable processing to reduce the mark data points into a single unique identifier. In some embodiments, mark identifier(s) 509B are represented as a number of separate facial number data points. Mark identifier(s) 509B can be used during an inmate identification process, as further discussed in FIG. 7, as a basis of comparison with facial data points retrieved from video data.

Additionally or alternatively, mark identifier(s) 509B can include manually input information, such as through workstation(s) 338. Manually input information can include textual descriptions of the mark, such as "orange phoenix tattoo."

Gait mechanics 509C can be based on recording the inmate's walking at the time of booking, converting the recording to a series of gait data points associated with the inmate's gait, and storing the data points as gait mechanics 509C as a basis of comparison when searches are performed. In some embodiments, gait mechanics 509C can be based on sampled video of the inmate walking in the prison and as capture by video cameras within the prison. In some embodiments, gait mechanics 509C can be updated based on sampled video. Audio identifier 509D can be based on recording the inmate's voice and can be used as a basis of comparison for performing voice recognition by audio analysis subsystem 340 of monitoring system 300. Audio identifier 509D can be updated over time while the inmate uses audio devices within the prison. For example, inmate's voice data can be updated by using audio recordings of the inmate's phone calls within the prison and that have been stored in a database, such as an Inmate Telephone System (ITS).

Monitoring system 300 may use additional video data to continuously update identification field 503 by retrieving additional imaging data points (e.g., facial information) of the inmate. Similarly, monitoring system 300 may use additional audio data to continuously update identification field 503 by retrieving additional audio data points (e.g., voice information) of the inmate. For example, monitoring system 300 may be provided access to additional sources of the inmate's visual and audio information. Additional sources can include but are not limited to real-time or stored inmate video visitation videos, crime scene videos, publically available videos (e.g., from the inmate's social media accounts), and recorded telephone calls made through the prison's telephone system. Monitoring system 300 may then analyze the additional video and/or audio data, retrieve the inmate identification information from the additional video and/or audio data, and update the inmate's identifying information in identification field 503.

Allowed locations field 504 is associated with locations data element 510 which includes areas of controlled environment that the inmate is authorized to be located such as a first location 510A (e.g., the inmate's cell block) and a second location 510B (e.g., dining hall). Allowed locations field 504 provides information to alert module 324 for generating alerts when appropriate. For example, authorized personnel can established location-based rules that the inmate is allowed in dining hall. Alert module 324 can retrieve these allowed locations and determine whether to trigger alerts based on the rules and detected inmate information.

Restrictions field 505 is associated with restrictions data element 511 which includes any restricted locations, relationships, or behaviors associated with the inmate such as a restricted location 511A (e.g., exercise yard) or a restricted relationship 511B (e.g., another inmate). Restrictions field 505 provides information to alert module 324 for generating alerts when appropriate. For example, authorized personnel can established location-based rules that the inmate is restricted from being in the exercise yard or relationship-based rules for sending alerts when an inmate is near another inmate. Alert module 324 can retrieve these restrictions and determine whether to trigger alerts based on the rules and detected inmate information.

Location history field 506 is associated with data element 512 which includes a history of the locations in controlled environment 101 in which the inmate has been detected such as a first detected location 512A and a second detected location 512B. First detected location 512A includes video information regarding the video in which the inmate is identified such as a date of the video clip, time duration of the video clip, location of the camera that detected the inmate, and is associated with audio/video data element 514. Video information can be provided automatically by video analysis subsystem 316. Audio/video data element 514 includes a screenshot 514A, video clip 514B, and audio clip 514C associated with the first detected location 512A. Audio clip 514C is provided if available such as when video cameras 207A-F include microphones (such as microphone 450) or when prison includes standalone microphones (such as standalone microphones 213A-213F). In some embodiments, only video data is stored in audio/video data element 514. Screenshot 514A and video clip 514B can be provided automatically by clip generator 332 of video analysis subsystem 316. Audio clip 514C can be provided automatically by audio analysis subsystem 340 if the prison include microphones. Audio/video data element 514 can store the actual files (e.g., the actual image, actual video clip file, or actual audio file) or can contain a pointer to the files stored in a separate location.

Similarly, second detected location 512B includes video information regarding a second video in which the inmate is identified and is associated with audio/video data element 515 that includes screenshot 515A, video clip 515B, and audio clip 515C of the identified inmate in the particular location. Alert module 324 of video analysis subsystem 316 can utilize location history field 506 for generating alerts based on location-based rules.

Relationship history field 507 is associated with relationship data element 513 which includes a history of the relationships in controlled environment 101 based on the inmates or personnel of controlled environment 101 with whom the inmate has been proximally detected. Relationship data element can include relationship entries such as a first detected relationship 513A and a second detected relationship 513B. First detected relationship 513A includes video information regarding the video in which the inmate is identified with another party such as a date of the video clip, time duration of the video clip, the name of the other party, a location of the camera that detected the relationship, and is associated with audio/video data element 516. Video information can be provided automatically by video analysis subsystem 316 and audio data can be provided by microphone 450 or standalone microphones 213A-F, if available. Audio/video data element 516 includes a screenshot 516A and video clip 516B associated with the first detected relationship 513A. Screenshot 516A and video clip 516B can be provided automatically by clip generator 332 of video analysis subsystem 316. Audio clip 516C can be provided automatically by audio analysis subsystem 340 if the prison include microphones. Audio/video data element 516 can store the actual files (e.g., the actual image, actual video clip file, or actual audio file) or can contain a pointer to the files stored in a separate location.

Similarly, second detected relationship 513B includes video information regarding a second video in which the inmate is identified with another person and is associated with audio/video data element 517 that includes screenshot 517A, video clip 517B, and audio clip 517C of the identified inmate and the other person. Alert module 324 of video analysis subsystem 316 can utilize relationship history field 507 for generating alerts based on relationship-based rules.

As discussed above, inmate profile 500 is merely exemplary. The fields discussed above can be organized in a different manner, excluded from the profile, and additional information can be included in inmate profile 500. For example, inmate profile 500 can also include voice samples and other biometric information of the inmate. For example, as previously discussed, if video data includes sounds identified as voices, monitoring system 300 can compare the identified voices within the video data to voice samples stored in inmate profile 500. Inmate profile 500 can also be updated to include video data that includes any voice information identified as being associated with the inmate.

Inmate profile 500 is intended to serve as a central repository for all information related to an inmate and to enable searches of video data to be performed based on the information stored in inmate profile 500. The information in inmate profile 500 generally is populated based on image recognition features of the inmate's face, marks, gait, and other identifying features of the inmate. The information in inmate profile 500 is intended to increase the efficiency of searches for the inmate's information and to retrieve associated video corresponding to the inmate and the search inquiries.

In some embodiments, employees of the prison, such as guards also have corresponding profiles, such as guard profiles that have substantially similar data records as described above with respect to inmate profile 500. For example, employee profiles would also have facial data of the employee so that they can be identified in video data. Such a feature would enable inmate tracking system to differentiate between employees of the prison and the inmates.

Figure 6:
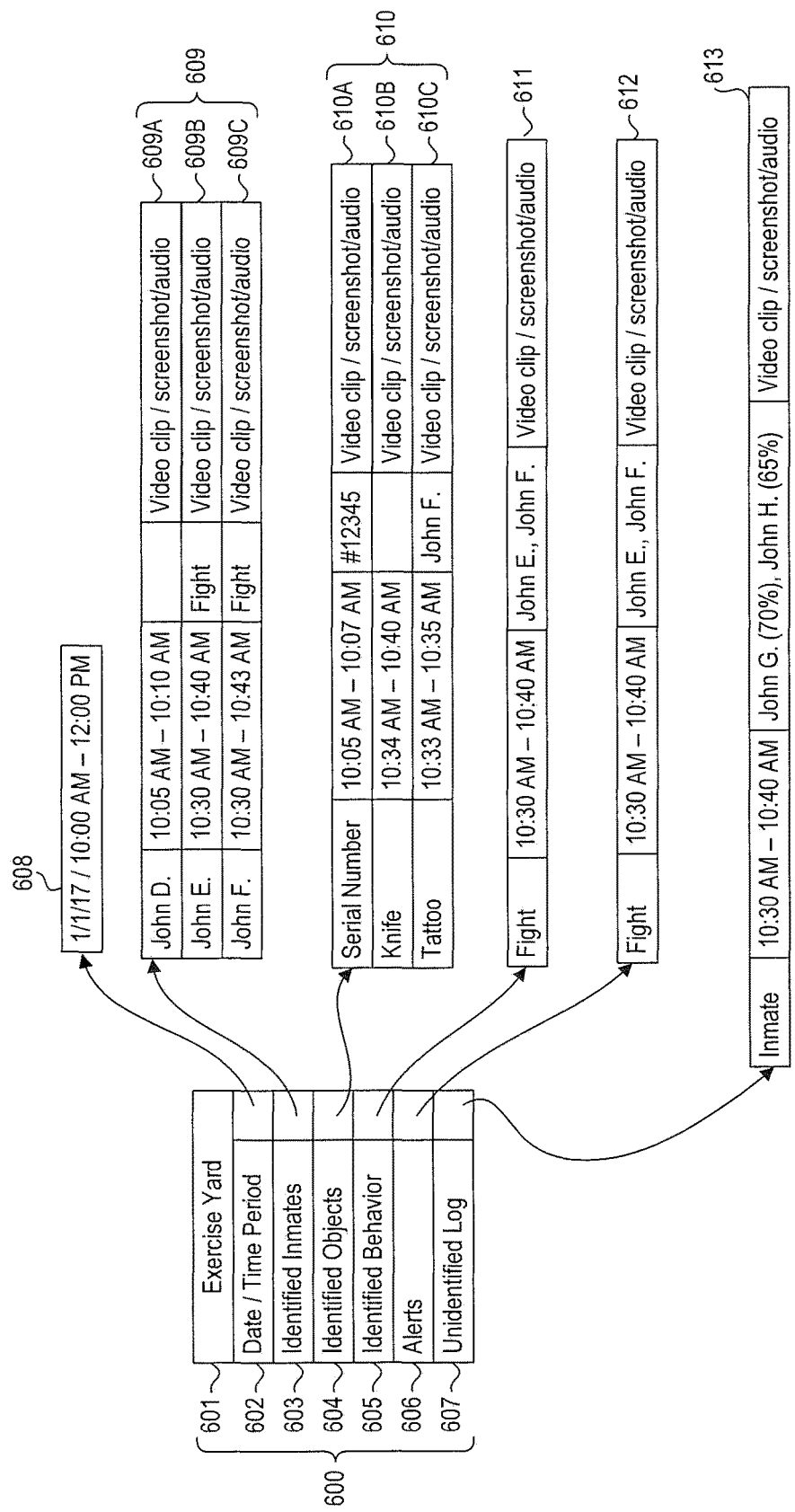
FIG. 6 illustrates an exemplary location profile for use in the exemplary inmate tracking system of FIG. 1, according to embodiments of the present disclosure.

FIG. 6 illustrates an exemplary location profile 600 for use in the exemplary inmate tracking system of FIG. 1, according to embodiments of the present disclosure. In contrast to inmate profile 500, location profile 600 organizes analyzed video based on the specific location of controlled environment. Similar to inmate profile 500, location profile 600 allows inmate profile system 100 store analyzed video data that enables search and retrieval features in a more efficient manner than simply searching through an entire video stream of a location. Location profile 600 enables inmate profile system 100 to store specific video data and associate the video data to terms or metadata that can be searched using, for example, workstation(s) 338. Location profile 600 organizes information for each inmate. Other methods of organizing analyzed video data are within the scope of the disclosure which is not limited to inmate profile 500 and location profile 600.

Workstation(s) 338 can submit search requests that include search terms such as the inmate's name or identifying marks that are compared with the information stored in location profile 600 in order to determine whether there is a match. A match can result in retrieving the associated video data such as one or more video clips that are associated with the search terms. Similar to inmate profile 500, data in location profile 600 can be updated automatically by profile module 322 of monitoring system 300 and/or manually by authorized personnel from workstation(s) 338.

In some embodiments, exemplary location profile 600 identifies location 601 of the camera for which the video data has been captured. For example, location 601 can identify "Exercise Yard" as the location of the camera. Exemplary location profile 600 can also include date/time period 602 of the video data is associated with data element 608 that provides the date and time period for which video data in location 601 has been captured. Video data can be segmented into predetermined time periods to decrease the size of video data that is stored in database 336. For example, video data can be segmented into two hour blocks.

Identified inmates 603 in location profile 600 is associated with data element 609 that can list, for example, a first identified inmate 609A, a second identified inmate 609B, and a third identified inmate 609C, all three of which, include, for example, the name of the identified inmate, a timestamp in which the identified inmate appears within the video data, any behaviors associated with the inmate during the timestamp (e.g., fight), as well as a video clip spanning the timestamp in which the identified inmate appears. First identified inmate 609A, a second identified inmate 609B, and third identified inmate 609C also can be include additional information that can be extracted from video data including a screenshot of the identified inmate. Video clips are generated by clip generator 332 of monitoring system 300. Audio data, which can be provided by microphones if available, can also be linked to location profile 600 and can include an audio clip of the incident. Audio clips can be generated by audio analysis subsystem 340 of monitoring system 300. Location profile 600 can store the actual files (e.g., the actual image, actual video clip file, or actual audio file) or can contain a pointer to the files stored in a separate location. In exemplary data element 609, location profile 600 identifies inmates John E. and John F. as being involved in a fight. Behaviors are identified based on behavior analysis module 326 in monitoring system 300.

Identified objects 604 in location profile 600 is associated with data element 610 that can list, for example, a first identified object 610A, a second identified object 610B, and a third identified object 610C, all three of which, include, for example, the name of the identified object, a timestamp in which the identified object appears within the video data, any other data associated with the identified object (e.g., a serial number, an inmate associated with the object), as well as a video clip spanning the timestamp and/or screenshot in which the identified object appears, and/or an audio clip if available.

Identified behavior 605 in location profile 600 is associated with data element 611 that can list, for example, a first identified behavior that includes identification of the behavior (e.g., fight), a timestamp in which the identified behavior occurs within the video data, any identified inmates associated with the identified behavior, as well as a video clip spanning the timestamp and/or screenshot in which the identified behavior appears, and/or an audio clip if available.

Alerts 606 in location profile 600 is associated with data element 612 that can list, for example, any alerts and the alert conditions that triggered the alert message to be sent. Authorized personnel can customize alerts based on selected parameters a behavior (e.g., fight). Authorized personnel can also customize the information that is transmitted when the behavior is selected such as a timestamp in which the identified behavior occurs within the video data, any identified inmates associated with the identified behavior, as well as a video clip spanning the timestamp and/or screenshot in which the identified behavior appears, and/or an audio clip if available.

Unidentified log 607 in location profile 600 is associated with data element 613 that can list, for example, any unidentified information from video data and/or an audio clip if available. Monitoring system 300 can place any objects from video data that does not meet a certain threshold in unidentified log 607. For example, data element 613 can list the possible candidates for an inmate that is identified in video data as well as the percentages that did not meet the threshold for identifying the inmate. Through workstation(s) 338, authorized personnel can manually identify the inmate based on the list of candidates identified in data element 613.

Exemplary Inmate Tracking System Operation

Exemplary usage of inmate tracking system 100 and monitoring system 300 in a controlled environment will be described with respect to FIGS. 7-10. The exemplary usage described in FIGS. 7-10 can be performed by processing logic that can comprise hardware (e.g., circuitry, dedicated logic, programmable logic, microcode, etc.), software (e.g., instructions executing on a processing device), or a combination thereof. For illustrative purposes, FIGS. 7-10 are described with respect to FIGS. 1-6 but are not limited to these example embodiments. For example, FIGS. 7-10 are described with respect to monitoring system 300.

Figure 7:
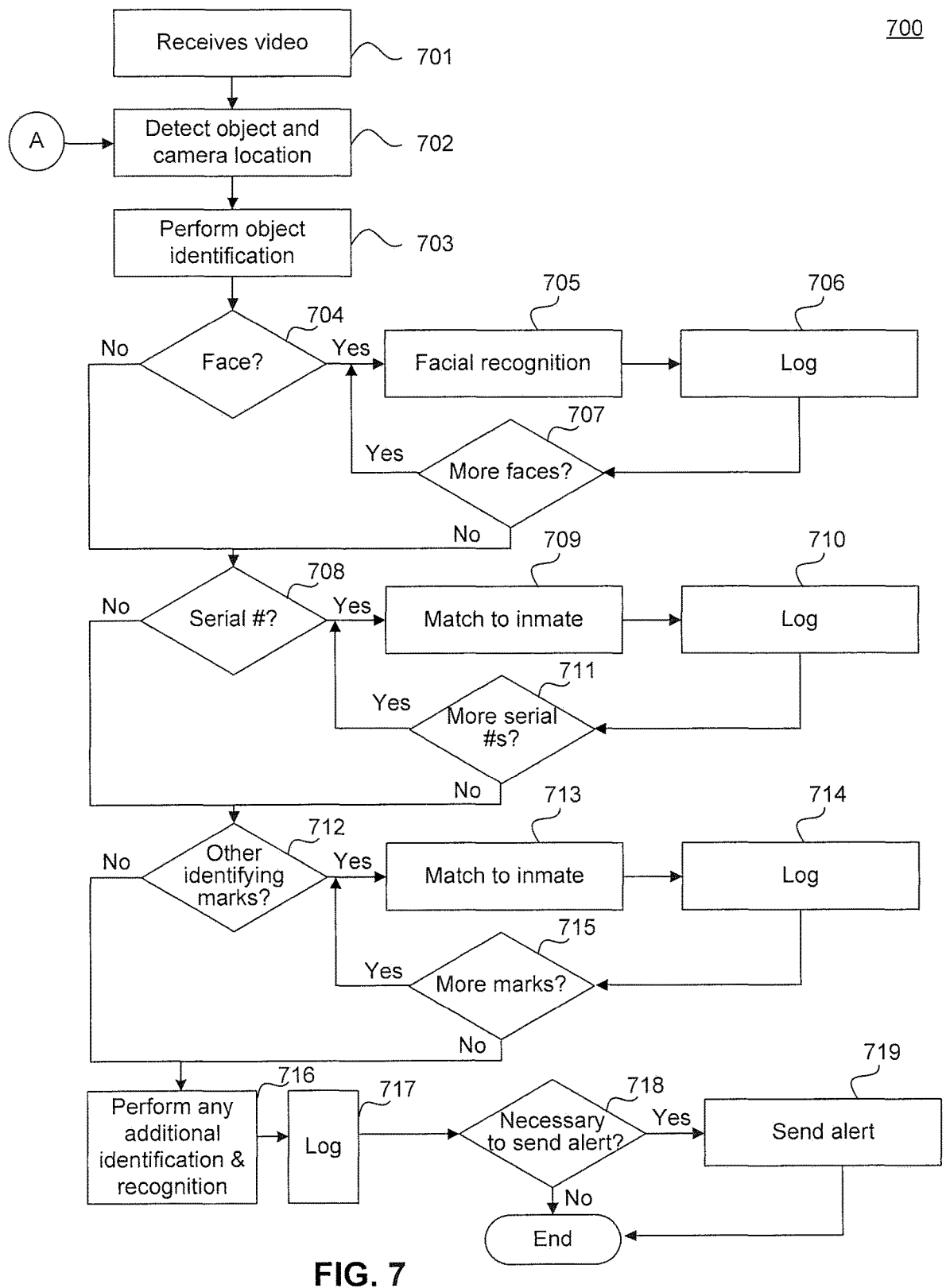
FIG. 7 illustrates a flowchart diagram of an exemplary method for analyzing and indexing video for use in the exemplary inmate tracking system of FIG. 1, according to embodiments of the present disclosure.

FIG. 7 illustrates a flowchart diagram of a method 700 for analyzing and indexing video for use in the exemplary inmate tracking system of FIG. 1, according to embodiments of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 7, as will be understood by a person of ordinary skill in the art. Some steps can be combined and performed as a single step. Method 700 can be performed by monitoring system 300 in real-time upon receiving video data, on stored video data at the request of authorized personnel, or on stored video data at predetermined times of the day.

In 701, monitoring system 300 receives video from an external source such as real-time video streams from video cameras 102A-102C or archived video data from database 336. In 702, monitoring system 300 performs object detection of the received video. In some embodiments, object detection can be performed by object identification module 318 of monitoring system 300. Monitoring system 300 also determines the camera location of the received video such as detecting the camera identifier in the video information associated with the received video.

In 703, monitoring system 300 begins the objection identification process to identify all objects including persons within the video data. In some embodiments, object identification can be performed by inmate identification module 320 of monitoring system 300. In 704, in order to identify persons in the video data, monitoring system 300 determines whether any detected objects include facial data. In 705, if there is at least one object identified as facial data, the detected facial data is compared with facial data associated with inmate profiles. In some embodiments, 705 includes identifying employees of the controlled environment by, for example, searching employee profiles and comparing the facial data from the video with facial data associated with employee profiles.

In 706, monitoring system 300 performs a logging function. If the monitoring system 300 identifies an inmate that matches the facial data, monitoring system 300 updates the inmate's profile with information of the video as described above with respect to inmate profile 500 in FIG. 5. In some embodiments, monitoring system 300 may employ a threshold parameter during the facial recognition step in 705. For example, the facial recognition of 705 may compare a number of facial data points in the detected facial data with a number of facial data points from inmate profiles. Monitoring system 300 may determine there is match when a certain percentage of the facial data points in the detected facial data meets a certain threshold of similarity with the facial data points within an inmate profile. If monitoring system 300 does not locate an inmate profile having facial data that matches the detected facial data from the video data, monitoring system 300 may still log the identification in a separate file, such as unidentified log 607, that can later be reviewed by authorized personnel.

In 707, monitoring system 300 determines whether any additional objects in the video data have facial data that require performing facial recognition. If so, monitoring system 300 repeats facial recognition step in 705. If not, monitoring system 300 continues with identifying additional objects. In 708, in order to identify persons in the video data, monitoring system 300 determines whether any detected objects include serial numbers. In 708, in some embodiments, monitoring system 300 determines a list of candidate serial numbers detected in video. The list of candidate serial numbers can be determined based on analyzing a number of image data points in the video data and using another threshold parameter to identify potential numbers based on the analyzed image data points. Monitoring system 300 may determine the candidate serial numbers when a certain percentage of the image data points meets a certain threshold for identifying the data points as numbers.

In 709, if there is at least one object identified as a serial number or a number of candidate serial numbers, the detected serial number (or candidate numbers) is compared with serial numbers associated with inmate profiles. In 709, monitoring system 300 may also utilize the results of previous steps to increase the accuracy of matching the video data to an inmate. For example, monitoring system 300 can use the results of facial recognition in 705 in combination with the results of serial number matching in 709 to identify the inmate. That is, if the results of facial recognition in 705 and the results of serial number matching in 709 both identify the same inmate, the likelihood increases that the identification of the inmate is correct.

In 710, monitoring system 300 performs a logging function. If the monitoring system 300 identifies an inmate that matches the detected serial number, monitoring system 300 updates the inmate's profile with information of the video as described above with respect to inmate profile 500 in FIG. 5. If monitoring system 300 does not locate an inmate profile having serial numbers that matches the detected serial numbers from the video data, monitoring system 300 may still log the identification in a separate file, such as unidentified log 607, that can later be reviewed by authorized personnel.

In 711, monitoring system 300 determines whether any additional objects in the video data have serial numbers that require serial number matching. If so, monitoring system 300 repeats the serial number matching step in 709. If not, monitoring system 300 continues with identifying additional objects. In 712, in order to identify persons in the video data, monitoring system 300 determines whether any detected objects include additional identifying marks such as tattoos or scars. In 713, if there is at least one object identified as am additional identifying mark, the detected identifying mark is compared with identifying marks associated with inmate profiles.

In 713, monitoring system 300 may also utilize the results of previous steps to increase the accuracy of matching the video data to an inmate. For example, monitoring system 300 can use the results of facial recognition in 705 and the results of serial number matching in 709 in combination with mark matching in 713 to identify the inmate. That is, if the results of facial recognition in 705, the results of serial number matching in 709, and the results of mark matching in 713 identify the same inmate, the likelihood increases that the identification of the inmate is correct.

In 714, monitoring system 300 performs a logging function. If the monitoring system 300 identifies an inmate that matches the detected mark, monitoring system 300 updates the inmate's profile with information of the video as described above with respect to inmate profile 500 in FIG. 5. If monitoring system 300 does not locate an inmate profile having serial numbers that matches the detected serial numbers from the video data, monitoring system 300 may still log the identification in a separate file, such as unidentified log 607, that can later be reviewed by authorized personnel. In 715, monitoring system 300 determines whether any additional objects in the video data have marks that require mark matching. If so, monitoring system 300 repeats the mark matching step in 713.

If not, in 716, any additional identification and recognition, such as identifying inmates based on gait analysis, can be performed. The number of identification and recognition steps can be configured by the administrator. Reducing the number of steps increases the speed of the recognition process while increasing the number of steps increases the accuracy of the recognition process. For example, monitoring system 300 can reduce the number of false positives by analyzing an increase number of available data points including audio data (discussed further in FIG. 8), video data, and gait information. In 717, monitoring system 300 performs a logging function based on if any additional information, such as identification of the inmate based on gait, is recognized within the video data.

In 718, monitoring system 300 determines whether any alert conditions have been triggered. In some embodiments, alert module 324 performs the determination based on the identification of the inmate performed by inmate identification module 320. Alert conditions include but are not limited to detecting an inmate in a specific location or detecting multiple inmates located near each other (e.g., within the same frame of the video). If alert module 324 determines that an alert condition is triggered based on the results of the previous steps, it sends an appropriate alert based on the parameters of the alert which include the people who are to receive the alert in 719.

Figure 8:
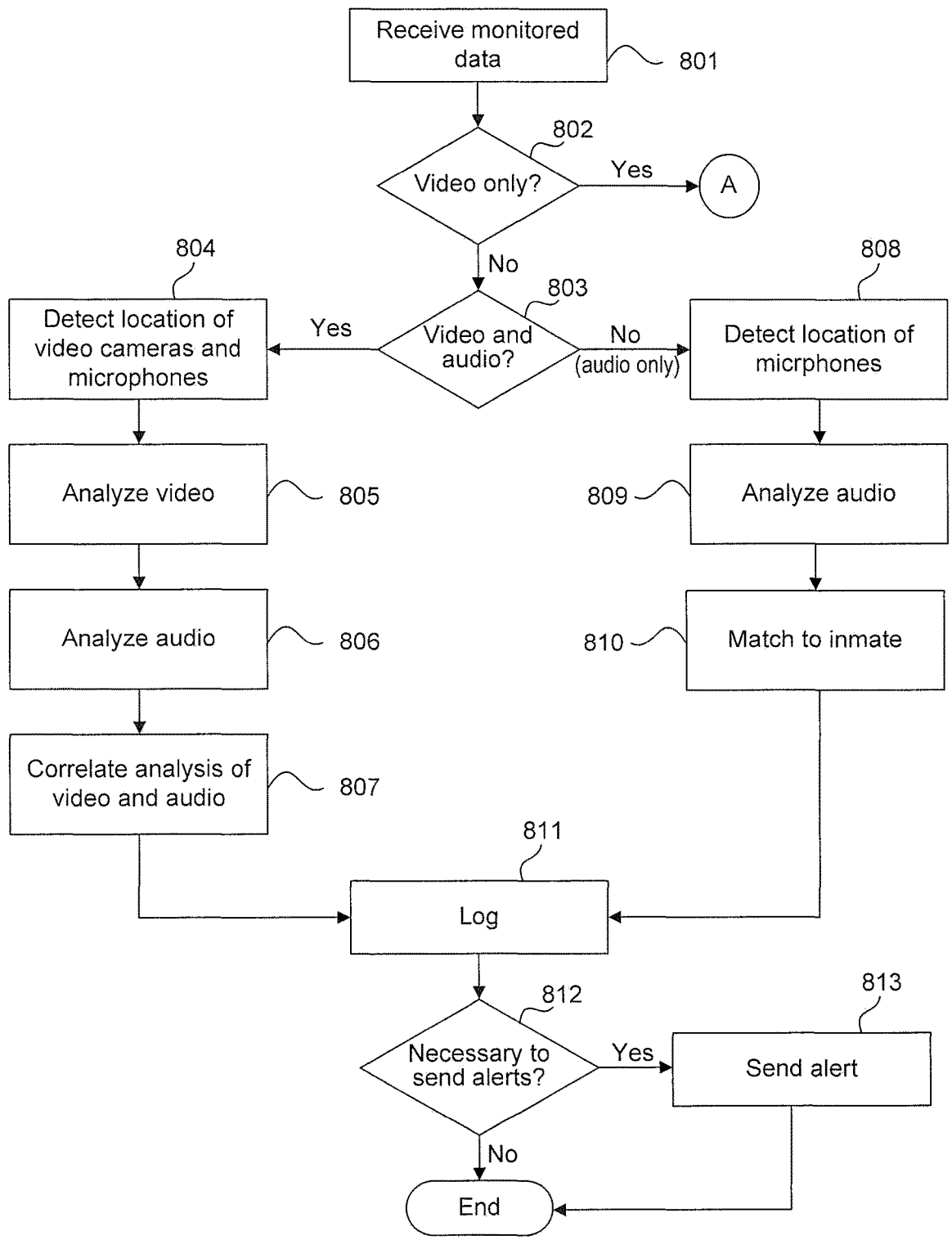
FIG. 8 illustrates a flowchart diagram of an exemplary method for analyzing and indexing video and/or audio for use in the exemplary tracking system of FIG. 1, according to embodiments of the present disclosure.

FIG. 8 illustrates a flowchart diagram of a method for analyzing and indexing video and/or audio for use in the exemplary tracking system of FIG. 1, according to embodiments of the present disclosure. Method 800 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 8, as will be understood by a person of ordinary skill in the art. Some steps can be combined and performed as a single step. Method 800 can be performed by monitoring system 300 in real-time upon receiving video data and/or audio data, on stored video data at the request of authorized personnel, or on stored video data at predetermined times of the day.

In 801, monitoring system 300 receives video and/or audio data from an external source such as real-time video and audio data streams from video cameras 102A-102C, archived video and audio data from database 336, and/or real-time audio data streams from standalone microphones 213A-F. In 802, monitoring system 300 determines whether the received data includes only video data. If yes, monitoring system 300 proceeds to 702 of FIG. 7 as discussed above.

In 803, monitoring system 300 determines whether the received data includes video and audio data or just audio data. If both video and audio data, monitoring system 300 proceeds to 804. In 804, monitoring system 300 determines the location of video cameras 207A-F and/or standalone microphones 213A-F associated with the received video and audio data. In 805, monitoring system 300 analyzes the video data. Examples of analyzing video data are discussed with respect to 703-716 of FIG. 7. In 806, monitoring system 300 next analyzes the audio data. Analyzing audio data includes performing voice recognition and ambient sound detection as discussed above with respect to audio analysis subsystem 340 in FIG. 3. In 807, monitoring system 300 utilizes the results of 805 and 806 to perform location detection and tracking features of the claimed disclosures. For example, monitoring system 300 can perform facial recognition of video data in 805 and audio recognition in 806 to determine the identify of an inmate within the received data. Monitoring system 300 can then associate the identified inmate with the detected location of video camera and/or microphone that provided the data as determined in 804. Based on the identified inmate and the associated location, monitoring system 300 may determine the location of a specific inmate.

If just audio data, monitoring system 300 proceeds to 808. In 808, monitoring system 300 determines the location of standalone microphones 213A-F associated with the received audio data. In 809, monitoring system 300 next analyzes the audio data which includes performing voice recognition and ambient sound detection. In 810, audio analysis subsystem 340 of monitoring system 300 attempts to identify the inmate (or guards) associated with the analyzed audio data as discussed with respect to FIG. 3.

After performing video/audio analysis of 804-807 or audio analysis of 808-809, monitoring system 300 logs the results of the analysis in 811. For example, monitoring system 300 can update an inmate profile of an identified inmate with the video data, audio data, and the results of the analysis. In 812, monitoring system 300 determines whether any alert conditions have been triggered. In some embodiments, alert module 324 performs the determination based on the identification of the inmate performed by inmate identification module 320. Alert conditions include but are not limited to detecting an inmate in a specific location or detecting multiple inmates located near each other (e.g., within the same frame of the video). If alert module 324 determines that an alert condition is triggered based on the results of the previous steps, it sends an appropriate alert based on the parameters of the alert which include the people who are to receive the alert in 813.

Figure 9:
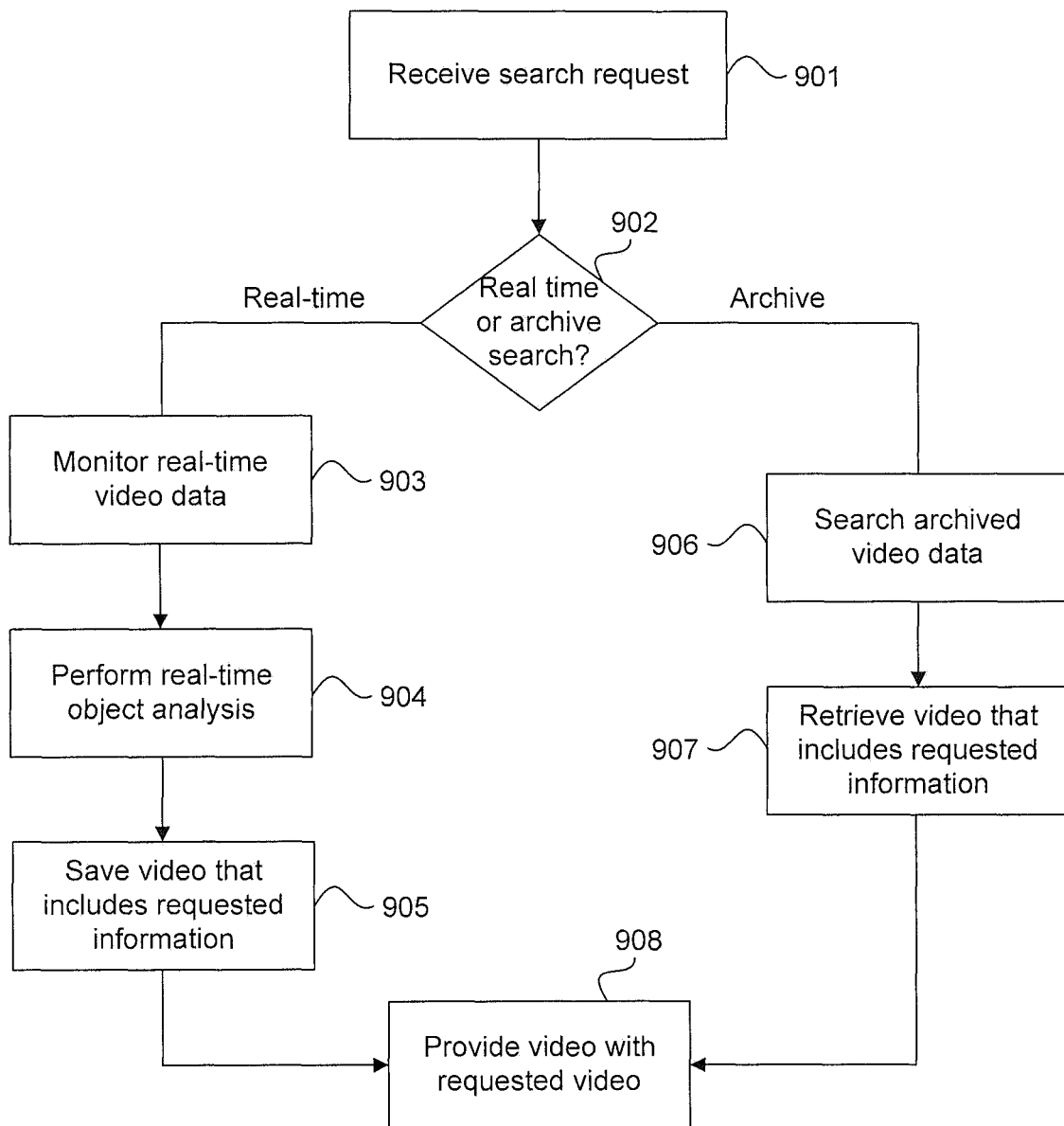
FIG. 9 illustrates a flowchart diagram of an exemplary method for processing search requests of video for use in the exemplary inmate tracking system of FIG. 1, according to embodiments of the present disclosure.

FIG. 9 illustrates a flowchart diagram of a method for processing search requests of video for use in the exemplary inmate tracking system of FIG. 1, according to embodiments of the present disclosure. Method 900 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 9, as will be understood by a person of ordinary skill in the art. Some steps can be combined and performed as a single step. Method 900 can be performed by monitoring system 300 in real-time upon receiving video data, on stored video data at the request of authorized personnel, or on stored video data at predetermined times of the day.

In 901, monitoring system 300 receives a search request. The search request can be transmitted by authorized personnel of controlled environment 101 such as through any of mobile devices 104A-104B and workstations 111-112. For example, specialized video retrieval and search applications can be installed on mobile devices 104A-104B and workstations 111-112 that provide authorized personnel access to video data and inmate profiles stored in database 336 of monitoring system 300. The applications can be customized for the needs of controlled environment 101 and can allow for any number of search terms to be input and form the basis of searching video data. Search requests may include, but are not limited to, searching for specific inmates by name, serial number, identifying marks, or a scanned image (e.g., a mug shot), searching for specific behaviors such as fights, and searching a specific time duration within a specific location of controlled environment 101.

In 902, monitoring system 300 determines from the search request whether to search real-time or archived video data. For example, the search request may include a parameter that indicates the type of search to be performed. Searching real-time or archived video data can be based on the type of search request. For example, searches of past incidents of behaviors such as fights would involve searching archived video data. Similarly, searching a specific time duration with a specific location could also involves searching archived video data. For example, authorized personnel could want to confirm that an inmate was in the specific location (e.g., video conference room 203) at a designated time. This information can be cross-referenced with a schedule to confirm that the inmate was present in the specific location as expected.

Real-time searches of real-time video data could be utilized to determine the current location of an inmate. A real-time search would result in monitoring system 300 performing video analysis on video data as it is received from video cameras in the inmate tracking system 100 in 903. In 904, monitoring system 300 performs real-time object identification of the monitored real-time video data which involves identifying inmates, objects, and behaviors from the real-time video data. This involves comparing the search terms (e.g., inmate name) with any identified information with the real-time video data. If there is a match, monitoring system 300 can identify and save the video that includes the requested search terms. In some embodiments, saving the video can include generating a video clip from the real-time video data where the video clip that spans a timestamp in which the requested search terms appears within the real-time video data. In 908, monitoring system 300 can return the video to workstation(s) 338.

Searches of archived video data would result in searching archived video data in 906. Information from archived video data may already have been indexed into inmate and/or location profiles. Accordingly, searching archived video includes searching information or metadata of inmate and/or location profiles. In 907, any video such as video clips that match the search terms of the search request. In 908, monitoring system 300 can return the video to workstation(s) 338.

Figure 10:
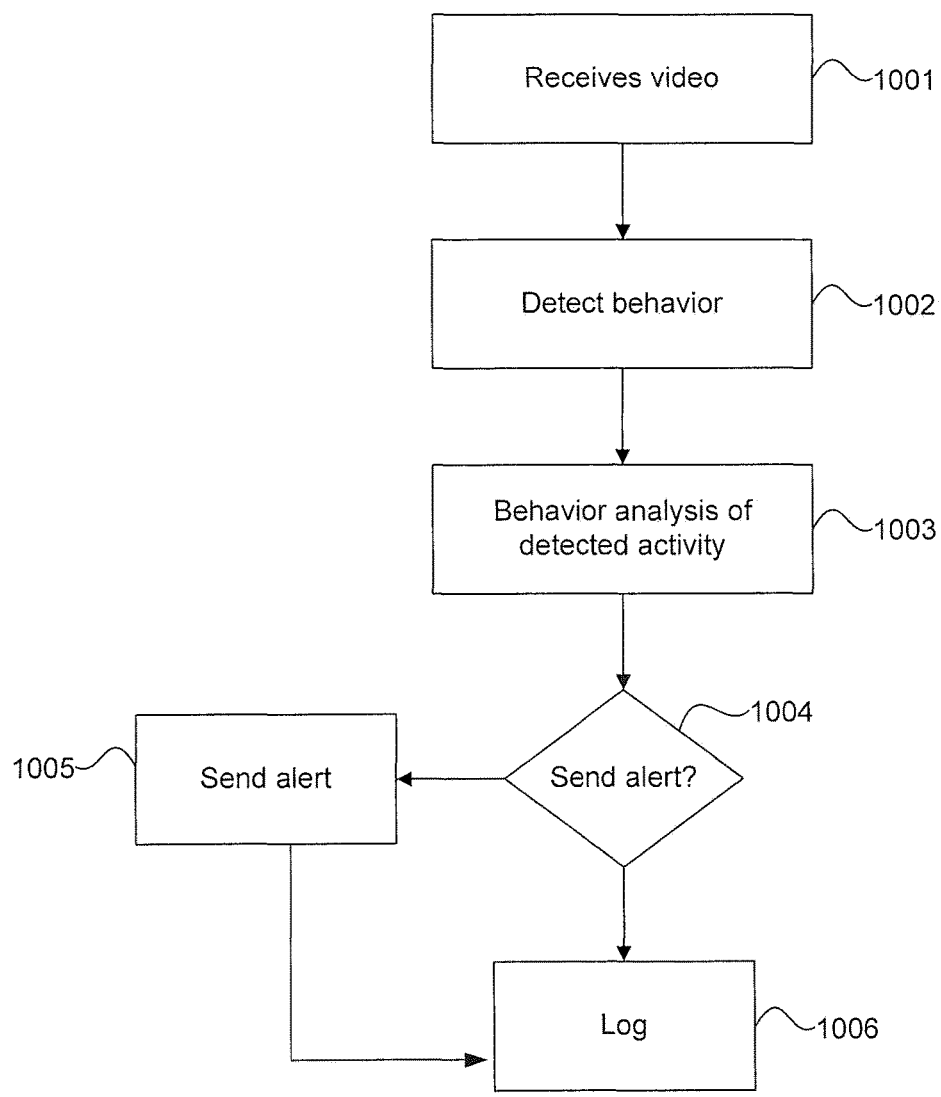
FIG. 10 illustrates a flowchart diagram of an exemplary method for analyzing video and detecting certain activity for use in the exemplary inmate tracking system of FIG. 1, according to embodiments of the present disclosure.

FIG. 10 illustrates a flowchart diagram of a method for analyzing video and detecting certain behaviors for use in the exemplary inmate tracking system of FIG. 1, according to embodiments of the present disclosure. Method 1000 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 10, as will be understood by a person of ordinary skill in the art. Some steps can be combined and performed as a single step. Method 1000 can be performed by monitoring system 300 in real-time upon receiving video data, on stored video data at the request of authorized personnel, or on stored video data at predetermined times of the day.

In 1001, monitoring system 300 receives video from an external source such as real-time video streams from video cameras 102A-102C or archived video data from database 336. In 1002, monitoring system 300 detects any behavior in the received video. Examples of behavior that are to be detected include fights, suicide attempts, and threatening behavior by inmates. In some embodiments, behavior detection can be initially performed by object identification module 318 of monitoring system 300. Object identification module 318 can provide the video data to behavior analysis 326 for behavior identification.

In 1003, behavior analysis 326 can include employ behavior algorithms for identifying the behaviors. For example, behavior analysis 326 can determine that an inmate has raised both of this arms above his head within his cell. The location of the inmate is determined by, for example, determining the location of the camera that provided the video feed. Behavior analysis 326 would identify such an action as a suicide attempt (e.g., attempting to fashion a noose above the inmate's head). As another example, behavior analysis 326 can determine that a fight may be imminent or occurring based on a count of inmates identified within the video data.

In 1004, monitoring system 300 can determine whether to send an alert based on the determined behavior. As previously discussed, authorized personnel can establish alert conditions that trigger alerts such as the detection of a suicide attempt or a fight. In 1005, monitoring system 300 sends the alert if alert conditions are met by the detected and identified behavior. In 1006, monitoring system 300 performs a logging function based on if any additional information, such as identification of the inmate based on gait, is recognized within the video data.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 11:
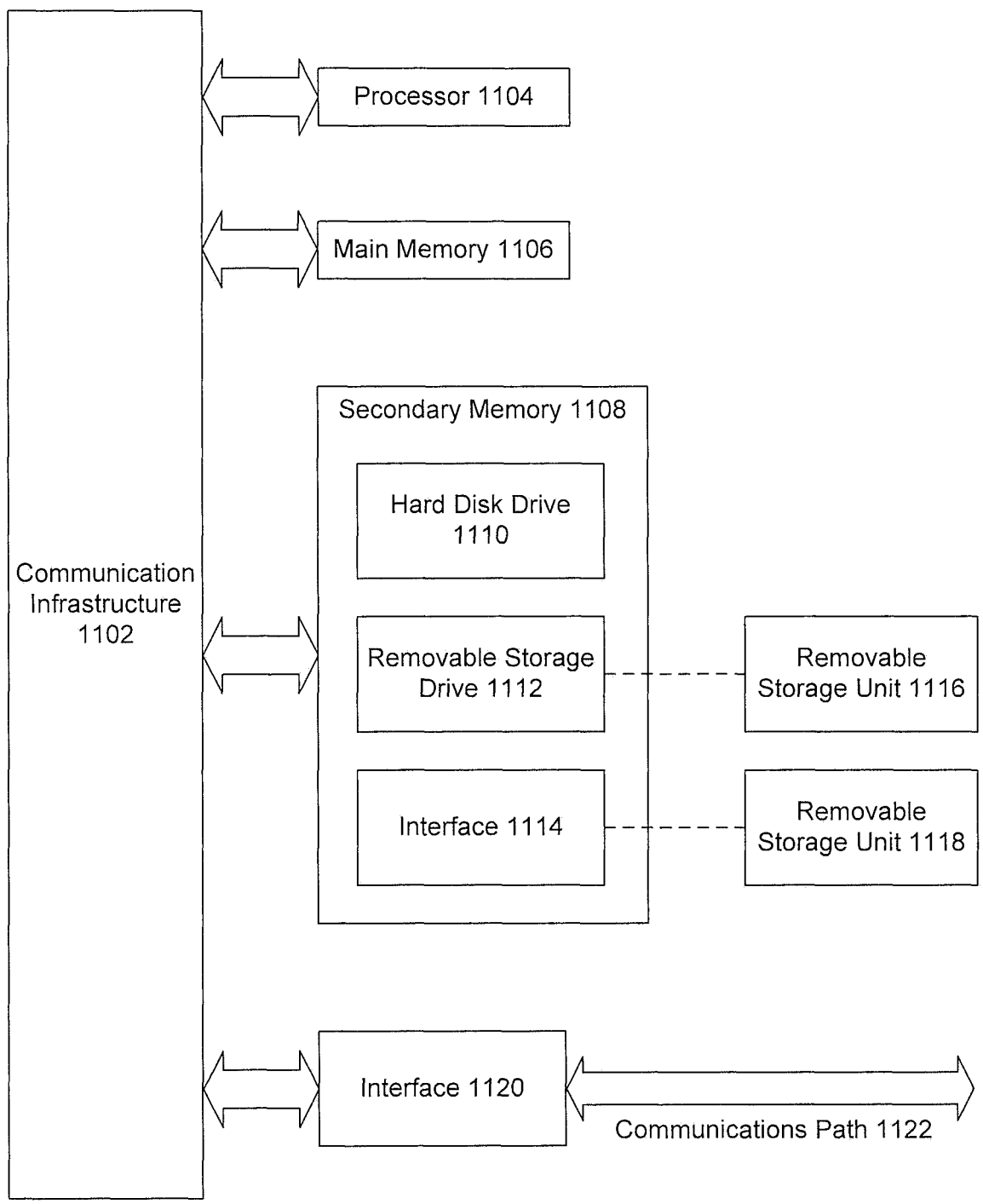
FIG. 11 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 7-9 can be implemented in the environment of one or more computer systems or other processing systems. An example of such a computer system 1100 is shown in FIG. 11. One or more of the modules depicted in the previous figures can be at least partially implemented on one or more distinct computer systems 1100.

Computer system 1100 includes one or more processors, such as processor 1104. Processor 1104 can be a special purpose or a general purpose digital signal processor. Processor 1104 is connected to a communication infrastructure 1102 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1106, preferably random access memory (RAM), and may also include a secondary memory 1108. Secondary memory 1108 may include, for example, a hard disk drive 1110 and/or a removable storage drive 1112, representing a floppy disk drive, a magnetic tape drive, an optical disk drive, or the like. Removable storage drive 1112 reads from and/or writes to a removable storage unit 1116 in a well-known manner. Removable storage unit 1116 represents a floppy disk, magnetic tape, optical disk, or the like, which is read by and written to by removable storage drive 1112. As will be appreciated by persons skilled in the relevant art(s), removable storage unit 1116 includes a computer usable storage medium having stored therein computer software and/or data.

In alternative implementations, secondary memory 1108 may include other similar means for allowing computer programs or other instructions to be loaded into computer system 1100. Such means may include, for example, a removable storage unit 1118 and an interface 1114. Examples of such means may include a program cartridge and cartridge interface (such as that found in video game devices), a removable memory chip (such as an EPROM, or PROM) and associated socket, a thumb drive and USB port, and other removable storage units 1118 and interfaces 1114 which allow software and data to be transferred from removable storage unit 1118 to computer system 1100.

Computer system 1100 may also include a communications interface 1120. Communications interface 1120 allows software and data to be transferred between computer system 1100 and external devices. Examples of communications interface 1120 may include a modem, a network interface (such as an Ethernet card), a communications port, a PCMCIA slot and card, etc. Software and data transferred via communications interface 1120 are in the form of signals which may be electronic, electromagnetic, optical, or other signals capable of being received by communications interface 1120. These signals are provided to communications interface 1120 via a communications path 1122. Communications path 1122 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1116 and 1118 or a hard disk installed in hard disk drive 1110. These computer program products are means for providing software to computer system 1100.

Computer programs (also called computer control logic) are stored in main memory 1106 and/or secondary memory 1108. Computer programs may also be received via communications interface 1120. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1112, interface 1114, or communications interface 1120.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method for tracking an inmate within a controlled environment, comprising:
   receiving, by a monitoring system, a video, wherein the video is provided by at least one video camera within the controlled environment;
   receiving, by the monitoring system, audio information, wherein the audio information is provided by at least one audio device within the controlled environment; and
   performing, by the monitoring system, an analysis of the video and the audio information, wherein the video analysis comprises:
   performing image recognition on the video;
   analyzing inmate identification information from the video based at least in part on the image recognition;
   determining a match between the analyzed inmate identification information and profile data associated with a plurality of inmate profiles;
   identifying, from the plurality of inmate profiles, an inmate profile associated with the inmate based at least in part on the match;
   retrieving, from a location profile, location information that indicates a physical location of the at least one video camera in a defined area within the controlled environment;
   determining a location of the video based at least in part on the retrieved location information;
   correlating the video with the audio information based on comparing the location of the video and a second location of the audio device; and
   updating an inmate location history in the inmate profile by associating the inmate profile with the location of the video based on the correlating.

2. The method of claim 1, wherein the determining the match comprises performing a comparison between the analyzed inmate identification information and the profile data, wherein the inmate identification information comprises a face.

3. The method of claim 2, wherein the profile data comprises facial data associated with the inmate and the determining the match further comprises:
   performing facial recognition on the inmate identification information;
   receiving a result based on the facial recognition; and
   comparing the result with the facial data.

4. The method of claim 1, further comprising:
   determining whether to send an alert based on at least one of the analyzed inmate identification information and the location of the video.

5. The method of claim 1, further comprising:
   receiving a search request, wherein the search request includes at least one parameter associated with the inmate and wherein the at least one parameter comprises at least one of: a serial number associated with the inmate, a name of the inmate, and an identifying mark associated with the inmate;

performing a search comparison between the at least one parameter and the profile data, wherein the search comparison comprises determining a search match between the at least one parameter and the profile data; and returning a search result based at least in part on the search comparison.

6. The method of claim 1, further comprising:

performing, by the monitoring system, an audio analysis of the audio information, wherein the audio analysis comprises:

performing audio recognition on the audio information; and determining an identity of the inmate based at least in part on the audio recognition.

7. The method of claim 1, wherein updating the inmate profile comprises:

generating a video clip from the video, wherein the video clip includes the analyzed inmate identification information; and associating the video clip with the inmate profile.

8. A monitoring system for tracking an inmate within a controlled environment, comprising:

a memory; and a processor coupled to the memory and configured to:

establish a connection with a video camera within the controlled environment;

receive video from the video camera through the connection, wherein the video comprises location information of the video camera;

receive audio information, wherein the information audio is provided by at least one audio device within the controlled environment;

analyze the video to retrieve inmate identification information from the video and audio;

retrieve, from a location profile, location information that indicates a physical location of the at least one video camera in a defined area within the controlled environment;

determine a location of the video based at least in part on the retrieved location information of the video camera;

correlate the video with the audio information based on comparing the location of the video and a second location of the audio device; and update an inmate location history in the inmate profile by associating the inmate profile with the location of the video based on the correlating.

9. The monitoring system of claim 8, wherein the retrieved inmate identification information comprises a face.

10. The monitoring system of claim 9, wherein the profile data comprises facial data associated with the inmate and wherein the processor is further configured to:

perform facial recognition on the retrieved inmate identification information;

receive a result based on the facial recognition; and compare the result with the facial data.

11. The monitoring system of claim 8, wherein the processor is further configured to:

determine whether to send an alert based on at least one of the retrieved inmate identification information and the location information of the video.

12. The monitoring system of claim 8, wherein the processor is further configured to:

receive a search request, wherein the search request includes at least one parameter associated with the inmate and wherein the at least one parameter comprises at least one of: a serial number associated with the inmate, a name of the inmate, and an identifying mark associated with the inmate;

perform a search comparison between the at least one parameter and the profile data, wherein the search comparison comprises determining a match between the at least one parameter and the profile data; and return a search result based at least in part on the search comparison.

13. The monitoring system of claim 8, wherein the profile data comprises at least one of facial data associated with the inmate, a serial number associated with the inmate, and a location history associated with the inmate.

14. The monitoring system of claim 8, wherein the processor is further configured to:

perform an audio analysis of the audio, wherein the audio analysis comprises:

performing audio recognition on the audio; and determining an inmate profile associated with the inmate based at least in part on the audio recognition.

15. A non-transitory computer-readable medium having instructions stored therein, which when executed by a processor in a wireless device, cause the processor to perform operations, the operations comprising:

receiving by a monitoring system, a video, wherein the video is provided by at least one video camera within a controlled environment;

receiving, by the monitoring system, audio information, wherein the audio information is provided by at least one audio device within the controlled environment; and performing, by the monitoring system, an analysis of the video and the audio information, wherein the analysis comprises:

performing image recognition on the video;

analyzing inmate identification information from the video based at least in part on the image recognition;

determining a match between the analyzed inmate identification information and profile data associated with a plurality of inmate profiles;

identifying, from the plurality of inmate profiles, an inmate profile associated with the inmate based at least in part on the match;

determining a location of the video based at least in part on location information of the at least one video camera, wherein the location information indicates a physical location of the at least one video camera in a defined area within the controlled environment;

correlating the video with the audio information based on comparing the location of the video and a second location of the audio device; and updating an inmate location history in the inmate profile by associating the inmate profile with the location of the video based on the correlating.

16. The non-transitory computer-readable medium of claim 15, wherein the determining the match comprises performing a comparison between the analyzed inmate identification information and the profile data, wherein the inmate identification information comprises a face.

17. The non-transitory computer-readable medium of claim 16, wherein the profile data comprises facial data associated with the inmate and determining the match, the operations further comprising:

performing facial recognition on the inmate identification information;

receiving a result based on the facial recognition; and comparing the result with the facial data.

18. The non-transitory computer-readable medium of claim 15, the operations further comprising:

determining whether to send an alert based on at least one of the analyzed inmate identification information and the location of the video.

19. The non-transitory computer-readable medium of claim 15, the operations further comprising:

receiving a search request, wherein the search request includes at least one parameter associated with the inmate and wherein the at least one parameter comprises at least one of: a serial number associated with the inmate, a name of the inmate, and an identifying mark associated with the inmate;

performing a search comparison between the at least one parameter and the profile data, wherein the search comparison comprises determining a search match between the at least one parameter and the profile data; and returning a search result based at least in part on the search comparison.

20. The method of claim 1, wherein the defined area is a specific room within the controlled environment, the method further comprising:

determining, based on the location of the video, that the inmate is not present in the specific room within the controlled environment.

* * * * *